(12) United States Patent
Kasegawa

(10) Patent No.: US 11,520,148 B2
(45) Date of Patent: Dec. 6, 2022

(54) OPTICAL DEVICE, IMAGE DISPLAY DEVICE, AND DISPLAY APPARATUS

(71) Applicant: SONY CORPORATION, Tokyo (JP)

(72) Inventor: Ryo Kasegawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 45 days.

(21) Appl. No.: 16/977,848

(22) PCT Filed: Feb. 15, 2019

(86) PCT No.: PCT/JP2019/005472
§ 371 (c)(1),
(2) Date: Sep. 3, 2020

(87) PCT Pub. No.: WO2019/176438
PCT Pub. Date: Sep. 19, 2019

(65) Prior Publication Data
US 2021/0026140 A1      Jan. 28, 2021

(30) Foreign Application Priority Data

Mar. 13, 2018   (JP) .............................. JP2018-045061

(51) Int. Cl.
*G02B 27/01*    (2006.01)
*G02B 5/32*     (2006.01)
*F21V 8/00*     (2006.01)

(52) U.S. Cl.
CPC ........... *G02B 27/0172* (2013.01); *G02B 5/32* (2013.01); *G02B 6/005* (2013.01); *G02B 6/0023* (2013.01);
(Continued)

(58) Field of Classification Search
CPC .... G02B 27/0172; G02B 5/32; G02B 6/0023; G02B 6/005; G02B 2027/0174; G02B 2027/0178
(Continued)

(56) References Cited

U.S. PATENT DOCUMENTS 9,715,067 B1 *  7/2017  Brown ............... G02B 27/0081
2006/0132914 A1 *  6/2006  Weiss ..................... G02B 30/40
359/462

(Continued)

FOREIGN PATENT DOCUMENTS

CN    101446685       6/2009
CN    101589327 A    11/2009
(Continued)

OTHER PUBLICATIONS

International Search Report prepared by the Japan Patent Office dated Apr. 10, 2019, for International Application No. PCT/JP2019/005472.
(Continued)

*Primary Examiner* — Collin X Beatty
(74) *Attorney, Agent, or Firm* — Sheridan Ross P.C.

(57) ABSTRACT

An optical device includes a first A deflecting member, a first B deflecting member, a first C deflecting member, a second A deflecting member, a second B deflecting member, and a second C deflecting member. Light emitted from an image forming device that enters the first A deflecting member and is emitted toward a pupil of an observer via the first B deflecting member and the first C deflecting member. Light emitted from the image forming device that enters the second A deflecting member is emitted toward the pupil of the observer via the second B deflecting member and the second C deflecting member. A direction of light deflected by the first A deflecting member that is orthogonally pro- (Continued)

jected on a light guide plate is opposite a direction of light deflected by the second A deflecting member that is orthogonally projected on the light guide plate.

20 Claims, 14 Drawing Sheets

(52) U.S. Cl.
CPC ............... *G02B 2027/0174* (2013.01); *G02B 2027/0178* (2013.01)

(58) Field of Classification Search
USPC .......................................................... 359/13
See application file for complete search history.

(56) References Cited

U.S. PATENT DOCUMENTS

| | | |
|---|---|---|
| 2009/0141324 A1 | 6/2009 | Mukawa |
| 2009/0303599 A1 | 12/2009 | Levola |
| 2010/0321781 A1 | 12/2010 | Levola et al. |
| 2011/0096401 A1 | 4/2011 | Levola |
| 2012/0044571 A1 | 2/2012 | Mukawa |
| 2015/0062715 A1 | 3/2015 | Yamada et al. |
| 2016/0018658 A1 | 1/2016 | Machida |
| 2018/0052276 A1 | 2/2018 | Klienman et al. |
| 2018/0364486 A1* | 12/2018 | Ding .................. G02F 1/13342 |
| 2020/0341280 A1* | 10/2020 | Bablumyan .............. G02B 5/32 |

FOREIGN PATENT DOCUMENTS

| | | |
|---|---|---|
| CN | 104423042 | 3/2015 |
| JP | 2008-546020 | 12/2008 |
| JP | 2009-133998 | 6/2009 |
| JP | 2009-539129 | 11/2009 |
| JP | 2010-032997 | 2/2010 |
| JP | 2015-049278 | 3/2015 |
| KR | 101496408 | 2/2015 |
| WO | WO 2008/148927 | 12/2008 |
| WO | WO-2017033601 A1 | 3/2017 |

OTHER PUBLICATIONS

Extended European Search Report for European Patent Application No. 19768425.1, dated Mar. 9, 2021, 8 pages.
Official Action (with English translation) for China Patent Application No. 201980017470.X, dated Feb. 16, 2022, 10 pages.

* cited by examiner

OPTICAL DEVICE, IMAGE DISPLAY DEVICE, AND DISPLAY APPARATUS

CROSS REFERENCE TO RELATED APPLICATIONS

This application is a national stage application under 35 U.S.C. 371 and claims the benefit of PCT Application No. PCT/JP2019/005472 having an international filing date of 15 Feb. 2019, which designated the United States, which PCT application claimed the benefit of Japanese Patent Application No. 2018-045061 filed 13 Mar. 2018, the entire disclosures of each of which are incorporated herein by reference.

TECHNICAL FIELD

The present disclosure relates to an optical device, an image display device including such an optical device, and a display apparatus including such an image display device, and more specifically, to a display apparatus used in a head-mounted display (HMD).

BACKGROUND ART

In recent years, the development of a head-mounted display (HMD), which displays an image from an image forming device on an optical device disposed in front of observer's eyes, has been intensively promoted. Various types of head-mounted displays have been studied, but for the head-mounted displays, there is a strong need for a wider angle of view of a displayed image so as to provide a more realistic image. To address such a demand, a head-mounted display including three deflecting means disposed on a light guide plate constituting an optical device is well known, for example, from U.S. Patent Application Laid-Open No. 2006/0132914A1 or U.S. Patent Application Laid-Open No. 2014/0330966A1.

Further, Japanese Patent Application Laid Open No. 2009-133998 discloses an image display device including (A) an image forming device including a plurality of pixels arranged in a two-dimensional matrix, (B) a collimating optical system for collimating light emitted from the pixels of the image forming device to be parallel light, and (C) an optical device, in which the light collimated to be a plurality of parallel light beams having different traveling orientations in the collimating optical system is incident, guided, and emitted, the optical device including (a) a light guide plate, in which incident light propagates by total reflection, and from which the incident light is emitted, (b) a first diffraction grating member disposed on the light guide plate and including a reflective volume hologram diffraction grating that diffracts and reflects the light incident on the light guide plate such that the light incident on the light guide plate is totally reflected inside the light guide plate, and (c) a second diffraction grating member disposed on the light guide plate and including a reflective volume hologram diffraction grating that diffracts and reflects the light propagated by total reflection inside of the light guide plate and emits the light from the light guide plate, in which assuming that the center of the first diffraction grating member is an origin, a normal of the first diffraction grating member that passes through the origin or a normal with a direction toward the collimating optical system side as a positive direction is an $X_i$ axis, an axis line of the light guide plate that passes through the origin, is orthogonal to the $X_i$ axis, and has a direction toward the second diffraction grating member side as a positive direction is a $Y_i$ axis, central light emitted from the pixel at the center of the image forming device and passing through the center of the collimating optical system is optically parallel to the $X_iY_i$ plane and intersects with the $X_iZ_i$ plane at a sharp angle.

CITATION LIST

Patent Literature

Patent Literature 1: U.S. Patent Application Laid-Open No. 2006/0132914A1

Patent Literature 2: U.S. Patent Application Laid-Open No. 2014/0330966A1

Patent Literature 3: Japanese Patent Application Laid Open No. 2009-133998

DISCLOSURE OF INVENTION

Technical Problem

However, in the head-mounted displays disclosed in the above two U.S. Patent Publications, light emitted from the center point of the image forming region of the image forming device is perpendicularly incident on the deflecting means, but the head-mounted displays fail to cope with a request for further widening the angle of view of a display image. Further, the image display device disclosed in Japanese Patent Application Laid Open No. 2009-133998 includes only two diffraction grating members of the first diffraction grating member and the second diffraction grating member, and thus a display image region in the light guide plate can be enlarged only in one direction propagating from the first diffraction grating to the second diffraction grating. However, providing three diffraction grating members can enlarge the display image region in the light guide plate in two directions.

Therefore, it is an object of the present disclosure to provide an optical device having a configuration or a structure that can further widen the angle of view of a display image, an image display device including such an optical device, and a display apparatus including such an image display device.

Solution to Problem

An optical device according to the present disclosure to achieve the above-mentioned object is an optical device, on which light emitted from an image forming device is incident, in which the light is guided, and from which the light is emitted, the optical device including: a light guide plate; a first deflecting unit; and a second deflecting unit. The first deflecting unit includes a first A deflecting member, a first B deflecting member, and a first C deflecting member. The second deflecting unit includes a second A deflecting member, a second B deflecting member, and a second C deflecting member. Part of the light emitted from the image forming device enters the first A deflecting member. The light incident on the first A deflecting member is deflected by the first A deflecting member, enters the first B deflecting member by total reflection inside of the light guide plate, is deflected by the first B deflecting member, enters the first C deflecting member by total reflection inside of the light guide plate, is deflected by the first C deflecting member, and is emitted toward a pupil of an observer. At least remaining part of the light emitted from the image forming device enters the second A deflecting member. The light incident on the second A deflecting member is deflected by the second A deflecting member, enters the second B deflecting member by total reflection inside of the light guide plate, is deflected by the second B deflecting member, enters the second C deflecting member by total reflection inside of the light guide plate, is deflected by the second C deflecting member, and is emitted toward the pupil of the observer. Assuming that a direction obtained when a propagation direction of the light deflected by the first A deflecting member is orthogonally projected on the light guide plate is a first direction, and that a direction obtained when a propagation direction of the light deflected by the second A deflecting member is orthogonally projected on the light guide plate is a second direction, the first direction is opposite to the second direction. Note that the term "total reflection" means total internal reflection or total reflection inside of the light guide plate.

An image display device according to the present disclosure to achieve the above-mentioned object is an image display device including: an image forming device; and an optical device, on which light emitted from the image forming device is incident, in which the light is guided, and from which the light is emitted, the optical device including the optical device according to the present disclosure.

A display apparatus according to the present disclosure to achieve the above-mentioned object is a display apparatus including: a frame to be mounted to a head of an observer; and an image display device attached to the frame, the image display device including an image forming device, and an optical device, on which light emitted from the image forming device is incident, in which the light is guided, and from which the light is emitted, the optical device including the optical device according to the present disclosure.

MODE(S) FOR CARRYING OUT THE INVENTION

Figure 1A:
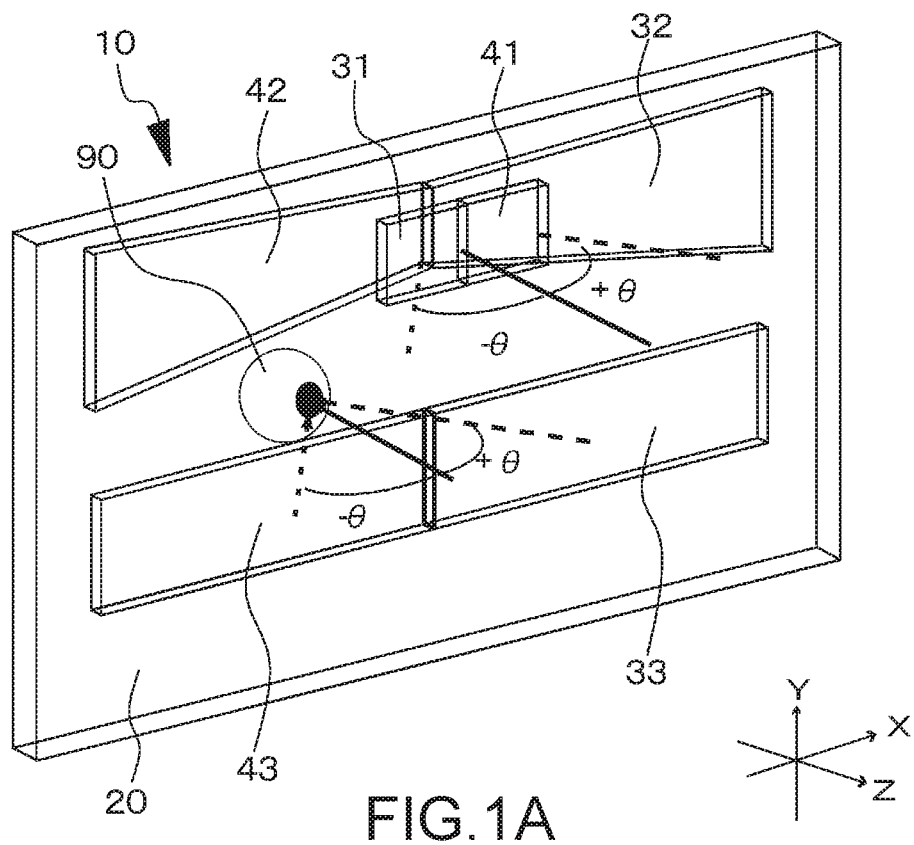
FIGS. 1A and 1B are respectively schematic perspective views of an optical device of a first embodiment and schematic views of the optical device of the first embodiment seen from above.

Hereinafter, the present disclosure will be described on the basis of embodiments with reference to the drawings. The present disclosure is not limited to the embodiments, and various numerical values and materials in the embodiments are illustrative. Note that the description will be given in the following order.
1. General Description of Optical Device, Image Display Device, and Display Apparatus of Present Disclosure
2. First Embodiment (Optical Device, Image Display Device, and Display Apparatus of Present Disclosure)
3. Second Embodiment (Modification of First Embodiment)
4. Third Embodiment (Modification of First and Second Embodiments)
5. Others <General Description of Optical Device, Image Display Device, and Display Apparatus of Present Disclosure>

In an optical device or the like of the present disclosure, assuming that a point on a light guide plate, at which light emitted from the center point of an image forming region of an image forming device collides with the light guide plate, is an origin, an axis line of the light guide plate that passes through the origin and is directed toward a first direction is an X-axis, an axis in a thickness direction of the light guide plate that passes through the origin is an Z-axis, and an axis that is orthogonal to the X-axis and the Z-axis is a Y-axis, a first deflecting unit and a second deflecting unit may be disposed symmetrically to a YZ plane.

In the optical device or the like of the present disclosure including the favorable form described above, the first A deflecting member and the second A deflecting member may each include a volume hologram diffraction grating, and satisfy $k^X_{1-A} + k^X_{2-A} = 0$, $k^Y_{1-A} = k^Y_{2-A}$, and $k^Z_{1-A} = k^Z_{2-A}$.

where a wave vector of the first A deflecting member is $k^v_{1-A}$, an X component, a Y component, and a Z component of $k^v_{1-A}$ are $k^X_{1-A}$, $k^Y_{1-A}$, and $k^Z_{1-A}$, respectively, a wave vector of the second A deflecting member is $k^v_{2-A}$, and an X component, a Y component, and a Z component of $k^v_{2-A}$ are $k^X_{2-A}$, $k^Y_{2-A}$, and $k^Z_{2-A}$, respectively. In this case, the first C deflecting member and the second C deflecting member may each include a volume hologram diffraction grating, and satisfy $k^X_{1-C} + k^X_{2-C} = 0$, $k^Y_{1-C} = k^Y_{2-C}$, and $k^Z_{1-C} = k^Z_{2-C}$, where a wave vector of the first C deflecting member is $k^v_{1-C}$, an X component, a Y component, and a Z component of $k^v_{1-C}$ are $k^X_{1-C}$, $k^Y_{1-C}$, and $k^Z_{1-C}$, respectively, a wave vector of the second C deflecting member is $k^v_{2-C}$, and an X component, a Y component, and a Z component of $k^v_{2-C}$ are $k^X_{2-C}$, $k^Y_{2-C}$, and $k^Z_{2-C}$, respectively. Furthermore, the first B deflecting member and the second B deflecting member may each include a volume hologram diffraction grating, and satisfy $$k^X_{1-B}+k^X_{2-B}=0,$$

$$k^Y_{1-B}=k^Y_{2-B}, \text{ and}$$

$$k^Z_{1-B}=k^Z_{2-C},$$

where a wave vector of the first B deflecting member is $k^v_{1-B}$, an X component, a Y component, and a Z component of $k^v_{1-B}$ are $k^X_{1-B}$, $k^Y_{1-B}$, and $k^Z_{1-B}$, respectively, a wave vector of the second B deflecting member is $k^v_{2-B}$, and an X component, a Y component, and a Z component of $k^v_{2-B}$ are $k^X_{2-B}$, $k^Y_{2-3}$, and $k^Z_{2-B}$, respectively. Furthermore, $$k^X_{1-A}+k^X_{2-B}=0,$$

$$k^Y_{1-B}=k^Y_{2-C}, \text{ and}$$

$$k^Z_{2-A}=k^Z_{2-B}=0, \text{ and}$$

$$k^Y_{2-B}+k^Y_{2-C}=0,$$

may be satisfied. Furthermore, $$k^v_{1-A}+k^v_{1-B}+k^v_{2-C}=0, \text{ and}$$

$$k^v_{2-A}+k^v_{2-B}+k^v_{2-C}=0$$

may be satisfied. Thus, the light incident on the first A deflecting member and the second A deflecting member, and the light emitted from the first C deflecting member and the second C deflecting member, have a conjugate relation. Note that, as described above, the vector is expressed by attaching a superscription letter "v", and the X, Y, and Z components of the vector are expressed by attaching superscription letters "X", "Y", and "Z" as described above.

Depending on the arrangement of the first A deflecting member, the first B deflecting member, and the first C deflecting member, the second A deflecting member, the second B deflecting member, and the second C deflecting member with respect to the light guide plate, the volume hologram diffraction grating may be transmissive or reflective. The volume hologram diffraction grating means a hologram diffraction grating that diffracts only +1 order diffracted light.

Furthermore, in the optical device or the like of the present disclosure including the favorable form described above, the part of the light that is emitted from the image forming device and enters the first A deflecting member may enter the second A deflecting member. That is, the first A deflecting member and the second A deflecting member may partially overlap. Specifically, the first A deflecting member has an end portion in the X direction, and the second A deflecting member has an end portion in the −X direction. The end portion of the first A deflecting member in the X direction and the end portion of the second A deflecting member in the −X direction may overlap each other.

Furthermore, in the optical device or the like of the present disclosure including the favorable form described above, the first A deflecting member and the first B deflecting member may be laminated, and the second A deflecting member and the second B deflecting member may be laminated. Alternatively, the first B deflecting member and the first C deflecting member may be laminated, and the second B deflecting member and the second C deflecting member may be laminated. The first A deflecting member, the first B deflecting member, and the first C deflecting member may be laminated, and the second A deflecting member, the second B deflecting member, and the second C deflecting member may be laminated.

Furthermore, in the optical device or the like of the present disclosure including the favorable form described above, the first A deflecting member, the first B deflecting member, and the first C deflecting member may each include a volume hologram diffraction grating, and satisfy $$\eta_{1-B}/\eta_{1-A}<1, \text{ and}$$

$$\eta_{1-C}/\eta_{1-A}<1$$

where with respect to the light emitted from the image forming device, an average diffraction efficiency of the first A deflecting member is $\eta_{1-A}$, an average diffraction efficiency of the first B deflecting member is $\eta_{1-B}$, and an average diffraction efficiency of the first C deflecting member is $\eta_{1-C}$, and the second A deflecting member, the second B deflecting member, and the second C deflecting member may each include a volume hologram diffraction grating, and satisfy $$\eta_{2-B}/\eta_{2-A}<1, \text{ and}$$

$$\eta_{2-C}/\eta_{2-A}<1$$

where with respect to the light emitted from the image forming device, an average diffraction efficiency of the second A deflecting member is $\eta_{2-A}$, an average diffraction efficiency of the second B deflecting member is $\eta_{2-B}$, and an average diffraction efficiency of the second C deflecting member is $\eta_{2-C}$.

It is favorable to satisfy $\eta_{1-B} \leq 0.2$, $\eta_{2-B} \leq 0.2$, $\eta_{1-C} \leq 0.2$, and $\eta_{2-C} \leq 0.2$. Here, a diffraction efficiency $\eta$ is expressed by $I_1/I_0$, where the light intensity of the light incident on the volume hologram diffraction grating is $I_0$, and the light intensity of the +1 order diffracted light diffracted by the volume hologram diffraction grating is $I_1$. The diffraction efficiency can be controlled, for example, by the thickness of the volume hologram diffraction grating. That is, if the thickness of the volume hologram diffraction grating is reduced, the value of the diffraction efficiency n is lowered. Further, as a refractive index modulation degree Δn in the volume hologram diffraction grating becomes larger, the value of the diffraction efficiency $\eta$ becomes lower. For example, assuming that, with the diffraction efficiency $\eta$=0.2, when the light (light amount=1.0) incident on the volume hologram diffraction grating is emitted from the volume hologram diffraction grating, $LI_1$ represents the amount of light emitted from a region of the volume hologram diffraction grating closest to a light incident portion of the volume hologram diffraction grating, $LI_2$ represents the amount of light emitted from the next closest region of the volume hologram diffraction grating, $LI_3$ represents the amount of light emitted from the third closest region of the volume hologram diffraction grating, and $LI_4$ represents the amount of light emitted from the fourth closest region of the volume hologram diffraction grating, $$LI_1=1.0 \times 0.2=0.2,$$

$$LI_2=(1.0-0.2) \times 0.2=0.16,$$

$$LI_3=(1.0-0.2-0.16) \times 0.2=0.128, \text{ and}$$

$$LI_4=(1.0-0.2-0.16-0.128) \times 0.2=0.102.$$

In the following description, for simplicity of explanation, the first A deflecting member and the second A deflecting member are collectively referred to as the first A deflecting member or the like, the first B deflecting member and the second B deflecting member are collectively referred to as the first B deflecting member or the like, and the first C deflecting member and the second C deflecting member are collectively referred to as the first C deflecting member or the like in some cases.

In the optical device or the like of the present disclosure including the favorable forms described above, the light emitted from the center point of the image forming region of the image forming device may also be configured to be incident perpendicularly to the first A deflecting member and the second A deflecting member, or may also be configured to be incident at a certain angle that is not perpendicular.

Further, all of the light deflected by the first A deflecting member may be incident on the first B deflecting member, all of the light deflected by the first B deflecting member may be incident on the first C deflecting member, all of the light deflected by the second A deflecting member may be incident on the second B deflecting member, and all of the light deflected by the second B deflecting member may be incident on the second C deflecting member. However, actually, part of the light deflected by the first A deflecting member and the second A deflecting member, and part of the light deflected by the first B deflecting member and the second B deflecting member may be lost in the light guide plate.

Furthermore, in the optical device or the like of the present disclosure including the favorable forms described above, the refractive index of the material constituting the light guide plate may be 1.5 or more, favorably 1.6 or more. The refractive index of the material constituting the volume hologram diffraction grating may be 1.5 or more, favorably 1.6 or more.

In the optical device or the like of the present disclosure including the favorable forms described above, the optical device is of a semi-transmissive type (see-through type). Specifically, at least the part of the optical device that faces an eyeball (pupil) of an observer is set to be semi-transmissive (see-through), and the outside may be viewed through this part of the optical device (specifically, at least the first C deflecting member and the second C deflecting member). Here, the term "semi-transmissive" does not mean transmitting or reflecting ½ (50%) of the incident light, but it is used in the sense of transmitting part of the incident light and reflecting the remaining part.

The image display device or the display apparatus of the present disclosure allows image display of a single color (e.g., green). On the other hand, if the image display of color is performed, the first A deflecting member or the like, the first B deflecting member or the like, and the first C deflecting member or the like can be configured by laminating P layers of diffraction grating layers each made of a volume hologram diffraction grating so as to correspond to the diffraction of P types of light having different P types (e.g., P=3, three types of red, green, and blue) of wavelength bands (or wavelengths). Interference fringes corresponding to one type of wavelength band (or wavelength) are formed in each grating layer. Alternatively, in order to correspond to the diffraction of the P types of light having different P types of wavelength bands (or wavelengths), P types of interference fringes may be formed in the first A deflecting member or the like, the first B deflecting member or the like, and the first C deflecting member or the like each including a single diffraction grating layer. Alternatively, for example, the following structure may also be adopted: the first A deflecting member or the like, the first B deflecting member or the like, and the first C deflecting member or the like each including a diffraction grating layer made of a volume hologram diffraction grating that diffracts and reflects light having a red wavelength band (or wavelength) are disposed on the first light guide plate; the first A deflecting member or the like, the first B deflecting member or the like, and the first C deflecting member or the like each including a diffraction grating layer made of a volume hologram diffraction grating that diffracts light having a green wavelength band (or a wavelength) are disposed on the second light guide plate; the first A deflecting member or the like, the first B deflecting member or the like, and the first C deflecting member or the like each including a diffraction grating layer made of a volume hologram diffraction grating that diffracts light having a blue wavelength band (or wavelength) are disposed on the third light guide plate; and the first light guide plate, the second light guide plate, and the third light guide plate are laminated with gaps between those light guide plates. Alternatively, for example, the following structure may also be adopted: the first A deflecting member or the like, the first B deflecting member or the like, and the first C deflecting member or the like each including a diffraction grating layer made of a volume hologram diffraction grating that diffracts and reflects light having a red wavelength band (or wavelength) are disposed on one surface of the first light guide plate; the first A deflecting member or the like, the first B deflecting member or the like, and the first C deflecting member or the like each including a diffraction grating layer made of a volume hologram diffraction grating that diffracts light having a green wavelength band (or a wavelength) are disposed on the other surface of the first light guide plate; the first A deflecting member or the like, the first B deflecting member or the like, and the first C deflecting member or the like each including a diffraction grating layer made of a volume hologram diffraction grating that diffracts light having a blue wavelength band (or wavelength) are disposed on the second light guide plate; and the first light guide plate and the second light guide plate are laminated with gaps between those light guide plates. Alternatively, for example, the following structure may be adopted: the first A deflecting member or the like, the first B deflecting member or the like, and the first C deflecting member or the like each including a diffraction grating layer made of a volume hologram diffraction grating that diffracts and reflects light having a red wavelength band (or wavelength), and the first A deflecting member or the like, the first B deflecting member or the like, and the first C deflecting member or the like each including a diffraction grating layer made of a volume hologram diffraction grating that diffracts light having a green wavelength band (or a wavelength) are laminated on one surface of a light guide plate; the first A deflecting member or the like, the first B deflecting member or the like, and the first C deflecting member or the like each including a diffraction grating layer made of a volume hologram diffraction grating that diffracts light having a blue wavelength band (or wavelength) are disposed on the other surface of the light guide plate. Alternatively, it is also possible to form P types of volume hologram diffraction gratings in the single diffraction grating layer. If these configurations are employed, it is possible to achieve an increase in diffraction efficiency, an increase in diffraction acceptance angle, and an optimization of the diffraction angle when light having the respective wavelength bands (or wavelengths) is diffracted in the first A deflecting member or the like, the first B deflecting member or the like, and the like and the first C deflecting member or the like. It is favorable to dispose a protective member such that the volume hologram diffraction grating does not come into direct contact with the atmosphere.

Examples of the material constituting the volume hologram diffraction grating include a photopolymer material. Constituent materials and basic structures of the volume hologram diffraction grating in the optical device or the like of the present disclosure may be the same as the constituent materials and structures of the conventional volume hologram diffraction gratings. In the volume hologram diffraction grating, interference fringes are formed over the surface from its inside, and the method of forming such interference fringes themselves may be the same as the conventional forming methods. Specifically, for example, the material constituting the volume hologram diffraction grating (e.g., a photopolymer material) is irradiated with object light from a first predetermined direction on one side, and at the same time, the material constituting the volume hologram diffraction grating is irradiated with reference light from a second predetermined direction on the other side, and the interference fringes formed by the object light and the reference light may be recorded inside the material constituting the volume hologram diffraction grating. The first predetermined direction, the second predetermined direction, and the wavelengths of the object light and the reference light are appropriately selected, and thus a desired pitch of the interference fringes at the surface of the volume hologram diffraction grating, and a desired inclination angle (slant angle) of the interference fringes can be obtained. The inclination angle of the interference fringe means the angle formed by the interference fringe and the surface of the volume hologram diffraction grating. In a case of a laminated structure of the P layers of the diffraction grating layers each made of the volume hologram diffraction grating, such lamination of the diffraction grating layers may be performed by, after the P layers of the diffraction grating layers are separately manufactured, laminating (bonding) the P layers of the diffraction grating layers by using an ultraviolet-curable adhesive, for example. Further, the P layers of the diffraction grating layers may be manufactured by, after a single diffraction grating layer is manufactured using a photopolymer material having viscosity, sequentially bonding thereon a photopolymer material having viscosity, to manufacture the diffraction grating layers.

The inclination angle (slant angle) of the interference fringes may be constant in the volume hologram diffraction grating or may be changed depending on the value of the angle of view of an image incident on the volume hologram diffraction grating. If the inclination angle of the interference fringes is changed depending on the value of the angle of view of the incident image, the inclination angle may be changed continuously or stepwisely.

Any photopolymer material can be used as long as the material constituting the volume hologram diffraction grating (photopolymer material constituting photosensitive material precursor layer before being irradiated with object light and reference light) includes at least a photopolymerizable compound, a binder resin, and a photopolymerization initiator. As the photopolymerizable compound, for example, it is possible to use known photopolymerizable compounds such as an acrylic monomer, a methacrylic monomer, a styrene-based monomer, a butadiene-based monomer, a vinyl-based monomer, and an epoxy-based monomer. These compounds may be copolymers or may be monofunctional or polyfunctional. Further, these monomers may be used alone or in combination. Any known binder resin may be used as the above-mentioned binder resin. Specifically, a cellulose acetate-based resin, an acrylic-based resin, an acrylic acid ester-based resin, a methacrylic acid resin, an epoxy-based resin, a urethane-based resin, a polypropylene resin, a polyvinyl ether resin, a polycarbonate resin, a polyamide resin, a polyvinyl acetate, a vinyl chloride-based resin, a urea-based resin, a styrene-based resin, a butadiene-based resin, a natural rubber-based resin, a polyvinyl carbazole, a polyethylene glycol, a phenol-based resin, a copolymer including the above-mentioned resins, gelatin, and the like may be used. The binder resins may also be used alone or in combination. Any known photopolymerization initiator may be used as the above-mentioned photopolymerization initiator. The photopolymerization initiators may be used alone or in combination. The photopolymerization initiator may be used in combination with at least one photosensitizer pigment. A plasticizer, a chain transfer agent, and other additives may be added to the photosensitive material precursor layer, as appropriate. The protective layer for protecting the volume hologram diffraction grating may include any transparent material. The protective layer may be formed through coating or laminating a material made into a film in advance onto the photosensitive material precursor layer. The material constituting the protective layer may be, for example, a polyvinyl alcohol (PVA) resin, an acrylic resin, a polyurethane resin, a polyethylene terephthalate (PET) resin, a cellulose triacetate (TAC) resin, a polymethyl methacrylate (PMMA) resin, a polypropylene resin, a polycarbonate resin, and a polyvinyl chloride resin.

In the image display device or the image display device in the display apparatus of the present disclosure including the various favorable forms described above, the image forming device may have a plurality of pixels arranged in a two-dimensional matrix. Note that an image forming device having such a configuration is referred to as "image forming device of a first configuration", for the purpose of convenience.

The image forming device of the first configuration may include: an image forming device including a reflective spatial light modulator and a light source; an image forming device including a transmissive spatial light modulator and a light source; and an image forming device including a light emitting element such as an organic electro luminescence (EL) element, an inorganic EL element, a light emitting diode (LED), or a semiconductor laser element. Of those, the image forming device including a reflective spatial light modulator and a light source or the image forming device including an organic EL element is favorably used. The spatial light modulator may include a transmissive or reflective liquid crystal display device including a light valve such as LCOS (Liquid Crystal On Silicon), and a digital micromirror device (DMD). The light source may include a light emitting element. Furthermore, the reflective spatial light modulator may include a liquid crystal display device, and a polarizing beam splitter that reflects part of light from the light source, guides the part of the light to the liquid crystal display device, passes therethrough part of the light reflected by the liquid crystal display device, and guides the part of the light to the optical system. The light emitting element constituting the light source may include a red light emitting element, a green light emitting element, a blue light emitting element, and a white light emitting element. Alternatively, red light, green light, and blue light emitted from the red light emitting element, the green light emitting element, and the blue light emitting element may be mixed and made uniform in luminance by using a light pipe, to thereby obtain white light. As the light emitting element, for example, a semiconductor laser device, a solid-state laser, and an LED can be exemplified. The number of pixels may be determined on the basis of the specifications required for the image display device. As a specific value of the number of pixels, 320×240, 432×240, 640×480, 1024×768, 1920×1080, and the like can be exemplified.

Alternatively, in the image display device or the image display device in the display apparatus of the present disclosure including the favorable forms described above, the image forming device may be configured to include a light source and scanning means for scanning parallel light emitted from the light source. Note that an image forming device having such a configuration is referred to as "image forming device of a second configuration", for the purpose of convenience.

The light source in the image forming device of the second configuration may include a light emitting element. Specifically, a red light emitting element, a green light emitting element, a blue light emitting element, and a white light emitting element can be used. Alternatively, red light, green light, and blue light emitted from the red light emitting element, the green light emitting element, and the blue light emitting element may be mixed and made uniform in luminance by using a light pipe, to thereby obtain white light. As the light emitting element, for example, a semiconductor laser device, a solid-state laser, and an LED can be exemplified. The number of pixels (virtual pixels) in the image forming device of the second configuration may also be determined on the basis of the specifications required for the image display device. As a specific value of the number of pixels (virtual pixels), 320×240, 432×240, 640×480, 1024×768, 1920×1080, and the like can be exemplified. Further, in the case of performing image display of color and in the case where the light source includes a red light emitting element, a green light emitting element, and a blue light emitting element, for example, it is favorable to perform color synthesis using a cross rhythm. The scanning means may include, for example, a galvano mirror or a micro electro mechanical system (MEMS) including micromirrors rotatable in two-dimensional directions, which horizontally and vertically scans the light emitted from the light source.

In the image forming device of the first configuration or the image forming device of the second configuration, the light made to be a plurality of parallel light beams in the optical system (which is an optical system that collimates the light emitted from the image forming device to obtain parallel light and may be referred to as a "parallel light emitting optical system", specifically, e.g., a collimating optical system or a relay optical system) is caused to enter the light guide plate. Such a request for being parallel light is based on the fact that the light wavefront information obtained when the light beams enter the light guide plate needs to be stored even after the light beams are emitted from the light guide plate through the first A deflecting member or the like, the first B deflecting member or the like, and the first C deflecting member or the like. Note that, in order to generate a plurality of parallel light beams, specifically, for example, a light emitting unit of the image forming device may be positioned at a position of the focal length in the parallel light emitting optical system, for example. The parallel light emitting optical system has a function of converting position information of a pixel into angle information in the optical system. Examples of the parallel light emitting optical system may include an optical system having a positive optical power as a whole, in which a convex lens, a concave lens, a free curved surface prism, and a hologram lens are used alone or in combination.

In order to cause the light emitted from the parallel light emitting optical system to enter the first A deflecting member and the second A deflecting member, appropriate light guide means only needs to be disposed between the parallel light emitting optical system, and the first A deflecting member and the second A deflecting member. A reflecting mirror can be used as the light guiding means. Further, the light emitted from the parallel light emitting optical system may be directly condensed on the first A deflecting member and the second A deflecting member.

The light guide plate has two parallel surfaces (first surface and second surface). Assuming that the surface of the light guide plate on which the light is incident is a light guide plate incident surface and that the surface of the light guide plate from which the light is emitted is a light guide plate emission surface, the light guide plate incident surface and the light guide plate emission surface may be configured by the first surface. Alternatively, the light guide plate incident surface may be configured by the first surface, and the light guide plate emission surface may be configured by the second surface.

Examples of the material constituting the light guide plate may include glass containing optical glass such as quartz glass or BK7, and a plastic material (e.g., a PMMA, a polycarbonate resin, an acrylic resin, an amorphous polypropylene-based resin, or a styrene-based resin containing an AS resin). The shape of the light guide plate is not limited to be flat, and it may have a curved shape. As a material having a refractive index of 1.5 or more, BK7, a polycarbonate resin, an amorphous polypropylene-based resin, and a styrene-based resin including an AS resin can be exemplified. As a material having a refractive index of 1.6 or more, an acrylic resin can be exemplified.

The image display device may include a dimmer. That is, the optical device may overlap at least part of the dimmer. More specifically, at least the first C deflecting member or the like of the optical device favorably overlap with the dimmer.

Specifically, the dimmer can be configured to include
a first substrate,
a second substrate facing the first substrate,
a first transparent electrode provided on the opposing surface of the first substrate facing the second substrate,
a second transparent electrode provided on the opposing surface of the second substrate facing the first substrate, and
a dimming layer sandwiched between the first transparent electrode and the second transparent electrode.
Note that, during operation of the dimmer, during operation of the dimmer, for example, a higher voltage is applied to the first transparent electrode than a voltage for the second transparent electrode.

The dimming layer may be an optical shutter that applies a color change of a substance generated by an oxidation-reduction reaction of an inorganic or organic electrochromic material. Specifically, the dimming layer may include an inorganic or organic electrochromic material. Further, the dimming layer may have a laminated structure of inorganic electrochromic material layers of a $WO_3$ layer/$Ta_2O_5$ layer/$Ir_xSn_{1-x}O$ layer, or a laminated structure of inorganic electrochromic material layers of a $WO_3$ layer/$Ta_2O_5$ layer/$IrO_x$ layer, from the first transparent electrode side. Instead of the $WO_3$ layer, a $MoO_3$ layer or a $V_2O_5$ layer can be used. Alternatively, a $ZrO_2$ layer or a zirconium phosphate layer may be used instead of the $IrO_x$ layer. Alternatively, a Prussian blue complex/nickel-substituted Prussian blue complex or the like may be used. As the organic electrochromic material, for example, an electrochromic material disclosed in Japanese Patent Application Laid Open No. 2014-111710 or Japanese Patent Application Laid Open No. 2014-159385 may also be used.

Alternatively, the dimming layer may include an electrophoretic dispersion or may include an optical shutter by an electrodeposition method (electrodeposition and electric field deposition) applying an electrodeposition and dissociation phenomenon generated by a reversible oxidation-reduction reaction of metal (e.g., silver particles), that is, an electrolyte containing metal ions.

Here, the electrophoretic dispersion contains a large number of charged electrophoretic particles and a dispersion medium having a color different from that of the electrophoretic particles. For example, in the case where the first transparent electrode is patterned, and the second transparent electrode is not patterned (so-called solid electrode configuration) and in the case where the electrophoretic particles are negatively charged, when a relatively negative voltage is applied to the first transparent electrode, and a relatively positive voltage is applied to the second transparent electrode, the negatively charged electrophoretic particles migrate so as to cover the second transparent electrode. Therefore, a light shielding rate in the dimmer has a high value. On the other hand, to the contrary, when a relatively positive voltage is applied to the first transparent electrode, and a relatively negative voltage is applied to the second transparent electrode, the electrophoretic particles migrate so as to cover the first transparent electrode. Therefore, the light shielding rate in the dimmer has a low value. Appropriately performing the voltage application to such transparent electrodes allows the light shielding rate in the dimmer to be controlled. The voltage may be direct current or alternating current. Any shape of the patterned first transparent electrode may be used if the electrophoretic particles migrate so as to cover the first transparent electrode and the value of the light shielding rate in the dimmer can be optimized when the light shielding rate in the dimmer has a low value. The shape of the patterned first transparent electrode may be determined by performing various tests. If desired, an insulating layer may be formed over the transparent electrode. As the material constituting the insulating layer, for example, a colorless transparent insulating resin may be used. Specifically, for example, an acrylic resin, an epoxy-based resin, a fluorine-based resin, a silicone-based resin, a polyimide-based resin, a polystyrene-based resin, or the like may be used.

As the material constituting the transparent first substrate and second substrate constituting the dimmer, specifically, a transparent glass substrate of soda-lime glass, white plate glass, or the like, a plastic substrate, a plastic sheet, and a plastic film may be exemplified. Here, the plastic may include polyethylene terephthalate, polyethylene naphthalate, polycarbonate, cellulose esters such as cellulose acetate, fluoropolymers such as copolymers of polyvinylidene fluoride or polytetrafluoroethylene and hexafluoropropylene, polyethers such as polyoxymethylene, polyacetal, polystyrene, polyethylene, polypropylene, polyolefin such as methylpentene polymer, polyimides such as polyamideimide or polyetherimide, polyamide, polyethersulfone, polyphenylene sulfide, polyvinylidene fluoride, tetraacetylcellulose, brominated phenoxy, polyarylate, polysulfone, and the like. The plastic sheet and the plastic film may have stiffness for which they are not bent easily, or may be flexible. If the first substrate and the second substrate are made of a transparent plastic substrate, a barrier layer made of an inorganic material or an organic material may be formed in the inner surface of the substrate.

The first substrate and the second substrate are sealed by a sealing member at the outer edge and are bonded to each other. Various resins of a thermosetting type, a photocurable type, a moisture curable type, an anaerobic curable type, and the like, such as an epoxy-based resin, an urethane-based resin, an acrylic resin, a vinyl acetate-based resin, an ene-thiol-based resin, a silicone-based resin, and a modified polymer resin, may be used as the sealing member, which is also referred to as a sealing agent.

If one of the substrates constituting the dimmer also serves as a constituent member of the optical device (specifically, a protective member disposed such that the volume hologram diffraction grating does not come into direct contact with the atmosphere), it is possible to reduce the weight of the entire display device, and there is no possibility of providing a discomfort feeling to a user of the display apparatus. Note that the other substrate may have a thinner configuration than the one of the substrates.

The first transparent electrode may be patterned or not. The second transparent electrode may be patterned or not. Specific examples of the materials constituting the first transparent electrode and the second transparent electrode may include, but are not limited to, an indium-tin composite oxide (including ITO, Indium Tin Oxide, Sn-doped $In_2O_3$, crystalline ITO, and amorphous ITO), fluorine-doped $SnO_2$ (FTO), IFO (F-doped $In_2O_3$), antimony-doped $SnO_2$ (ATO), $SnO_2$, ZnO (including Al-doped ZnO or B-doped ZnO), an indium-zinc composite oxide (IZO, Indium Zinc Oxide), a spinel-type oxide, an oxide having a $YbFe_2O_4$ structure, and conductive polymers such as polyaniline, polypyrrole, and polythiophene. Further, it is also possible to use a combination of two or more types of them. The first transparent electrode and the second transparent electrode may be formed on the basis of physical vapor deposition methods (PVD methods) such as a vacuum vapor deposition method and a sputtering method, various chemical vapor deposition methods (CVD methods), various coating methods, and the like, and patterning can be performed in any method such as an etching method, a lift-off method, and a method using various masks.

The dimmer may be disposed on a front portion. In this case, the front portion may have a rim, and the dimmer may be fitted into the rim. Further, in the display apparatus of the present disclosure including various favorable forms described above, the optical device and the dimmer may be disposed in this order from the observer side, or the dimmer and the optical device may be disposed in this order.

An illuminance sensor (environmental illuminance measurement sensor) for measuring the illuminance of the environment, in which the display apparatus is placed, is further provided, and the light shielding rate of the dimmer can be controlled on the basis of a measurement result of the illuminance sensor (environmental illuminance measurement sensor). Alternatively, an illuminance sensor (environmental illuminance measurement sensor) for measuring the illuminance of the environment, in which the display apparatus is placed, is further provided, and the luminance of an image formed by the image forming device can be controlled on the basis of a measurement result of the illuminance sensor (environmental illuminance measurement sensor). These forms may be used in combination.

Alternatively, a second illuminance sensor for measuring the illuminance based on the light passing through the dimmer from the external environment (for the purpose of convenience, referred to as transmitted light illuminance measurement sensor in some cases) is further provided, and the light shielding rate of the dimmer can be controlled on the basis of a measurement result of the second illuminance sensor (transmitted light illuminance measurement sensor). Alternatively, a second illuminance sensor (transmitted light illuminance measurement sensor) for measuring the illuminance based on the light passing through the dimmer from the external environment is further provided, and the luminance of an image formed by the image forming device can be controlled on the basis of a measurement result of the second illuminance sensor (transmitted light illuminance measurement sensor). Note that the second illuminance sensor (transmitted light illuminance measuring sensor) is favorably disposed on the observer side relative to the optical device. At least two second illuminance sensors (transmitted light illuminance measurement sensors) may be disposed to measure the illuminance based on the light passing through a portion of a high light shielding rate and to measure the illuminance based on the light passing through a portion of a low light shielding rate. These forms may be used in combination. Furthermore, these forms may be combined with a form for performing control on the basis of the measurement result of the illuminance sensor (environmental illuminance measurement sensor) described above.

The illuminance sensor (environmental illuminance measurement sensor, transmitted light illuminance measurement sensor) may be formed of a well-known illuminance sensor, and the illuminance sensor may be controlled on the basis of a well-known control circuit.

The highest light transmittance of the dimmer can be 50% or more, and the lowest light transmittance of the dimmer can be 30% or less. Note that the upper limit value of the highest light transmittance of the dimmer can be 99%, and the lower limit value of the lowest light transmittance of the dimmer can be 1%. Here, the following relationship is established.

(Light Transmittance)=1−(Light Shielding Rate)

A connector may be attached to the dimmer (specifically, a connector may be attached to the first transparent electrode or the second transparent electrode), and the dimmer may be electrically connected to a control circuit (a dimmer control circuit, for example, included in a control device for controlling the image forming device) for controlling the light shielding rate of the dimmer, via the connector and wiring.

In some cases, the light passing through the dimmer may be colored in a desired color by the dimmer. In this case, the color to be provided by the dimmer may be variable. Alternatively, the color to be provided by the dimmer may be fixed. Note that, in the former case, for example, a dimmer for red color, a dimmer for green color, and a dimmer for blue color may be laminated. Further, in the latter case, a brown color, though not limited to, can be exemplified as a color to be provided by a dimmer.

The observer can observe the brightness of the light that has passed through the dimmer and the optical device and can control and adjust the light shielding rate manually by operating a switch, a button, a dial, a slider, a knob, or the like. Alternatively, the observer can control and adjust the light shielding rate on the basis of the measurement result of the second illuminance sensor (transmitted light illuminance measurement sensor) for measuring the illuminance on the basis of the light passing through the dimmer from the external environment described above. Note that, specifically, the control and adjustment of the light shielding rate only need to control the voltage applied to the first transparent electrode and the second transparent electrode. At least two second illuminance sensors (transmitted light illuminance measurement sensors) may be disposed to measure the illuminance based on the light passing through a portion of a high light shielding rate and to measure the illuminance based on the light passing through a portion of a low light shielding rate. The display apparatus may include one image display device, or may include two image display devices. If the display apparatus includes two image display devices, the voltage applied to the first transparent electrode and the second transparent electrode is adjusted in each of one of the dimmers and the other dimmer, and thus the light shielding rate in the one dimmer and the light shielding rate in the other dimmer can be equalized. The light shielding rate in the one dimmer and the light shielding rate in the other dimmer can be controlled, for example, on the basis of the measurement result of the second illuminance sensor (transmission electron illuminance measurement sensor) for measuring the illuminance based on the light passing through the dimmer from the external environment described above. Alternatively, the observer can observe the brightness of the light that has passed through the one dimmer and the optical device and the brightness of the light that has passed through the other dimmer and the optical device, and can control and adjust the light shielding rate manually by operating a switch, a button, a dial, a slider, a knob, or the like. When the light shielding rate is adjusted, a test pattern may be displayed on the optical device.

In the display apparatus of the present disclosure, a frame may include a front portion disposed in front of the observer and two temple portions pivotally attached at both ends of the front portion through hinges. Note that a tip cell portion is attached to the distal end portion of each temple portion. The image display device is attached to the frame. Specifically, for example, the image forming device only needs to be attached to the upper portion of the front portion. Further, the front portion and the two temple portions may be integrated. That is, when the whole of the display apparatus of the present disclosure is viewed, the frame generally has the same structure as that of ordinary glasses. The material constituting the frame including a pad portion may be made of the same material as the material constituting the ordinary glasses, such as metals, alloys, plastic, and combinations thereof. Furthermore, a nose pad may be attached to the front portion. That is, when the whole of the display apparatus of the present disclosure is viewed, the assembly of the frame (including rim) and the nose pad has substantially the same structure as that of the ordinary glasses. The nose pad can also have a well-known configuration and structure.

Further, in the display apparatus of the present disclosure, from the viewpoint of design or ease of mounting, it is desirable that the wiring (signal line, power line, or the like) from one or two image forming devices extends from the distal end portion of the tip cell portion to the outside through the inside of the temple portion and the tip cell portion, and is connected to a control device (control circuit or control means). Furthermore, each of the image forming devices includes a headphone portion, and headphone portion wiring from each image forming device may also extend from the distal end portion of the tip cell portion to the headphone portion through the inside of the temple portion and the tip cell portion. Examples of the headphone portion may include an inner ear type headphone portion and a canal type headphone portion. More specifically, the headphone portion wiring favorably extends from the distal end of the tip cell portion to the headphone portion so as to come around behind the rear side of the pinna (ear shell).

Further, an imaging device may be attached to the central portion of the front portion. Specifically, for example, the imaging device includes a solid-state imaging device such as a CCD or CMOS sensor and a lens. The wiring from the imaging device may be connected to one of the image display devices (or image forming devices) via the front portion, for example, and may be included in the wiring extending from the image display device (or image forming device).

A head-mounted display (HMD) can be configured, for example, by the display apparatus of the present disclosure. Thus, the weight reduction and the size reduction of the display apparatus can be achieved, and a discomfort feeling during wearing of the display apparatus can be significantly reduced. Furthermore, the manufacturing cost can also be reduced. Alternatively, the image display device of the present disclosure can be applied to a head-up display (HUD) provided in a cockpit or the like of an aircraft or a vehicle. Specifically, a HUD including a virtual image forming region, in which a virtual image is formed on the basis of the light emitted from the image forming device, disposed on a windshield of a cockpit or the like of an aircraft or a vehicle may be provided. Alternatively, a HUD including a combiner, having a virtual image forming region in which a virtual image is formed on the basis of the light emitted from the image forming device, disposed on a windshield of a cockpit or the like of an aircraft or a vehicle may be provided.

FIRST EMBODIMENT

Figure 1B:
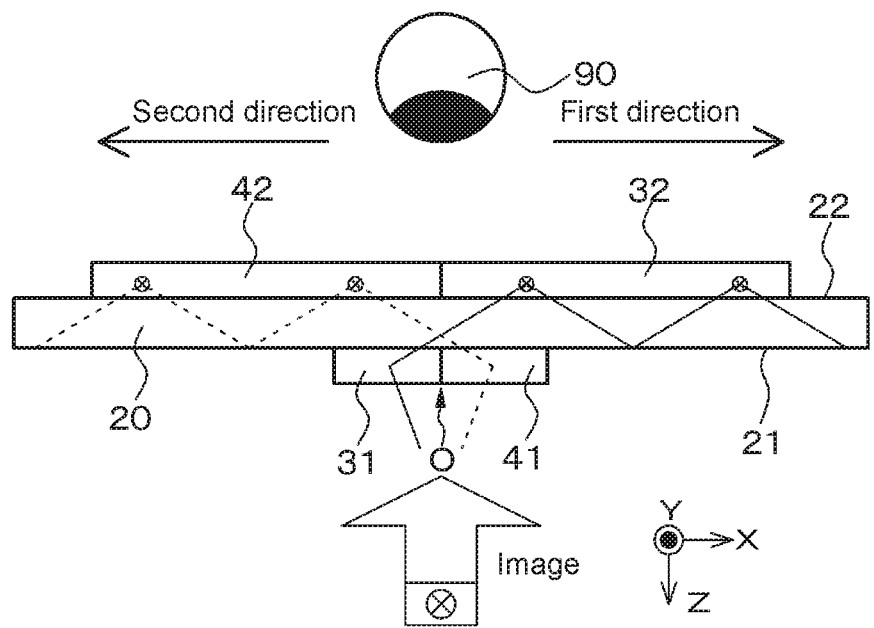
Figure 2:
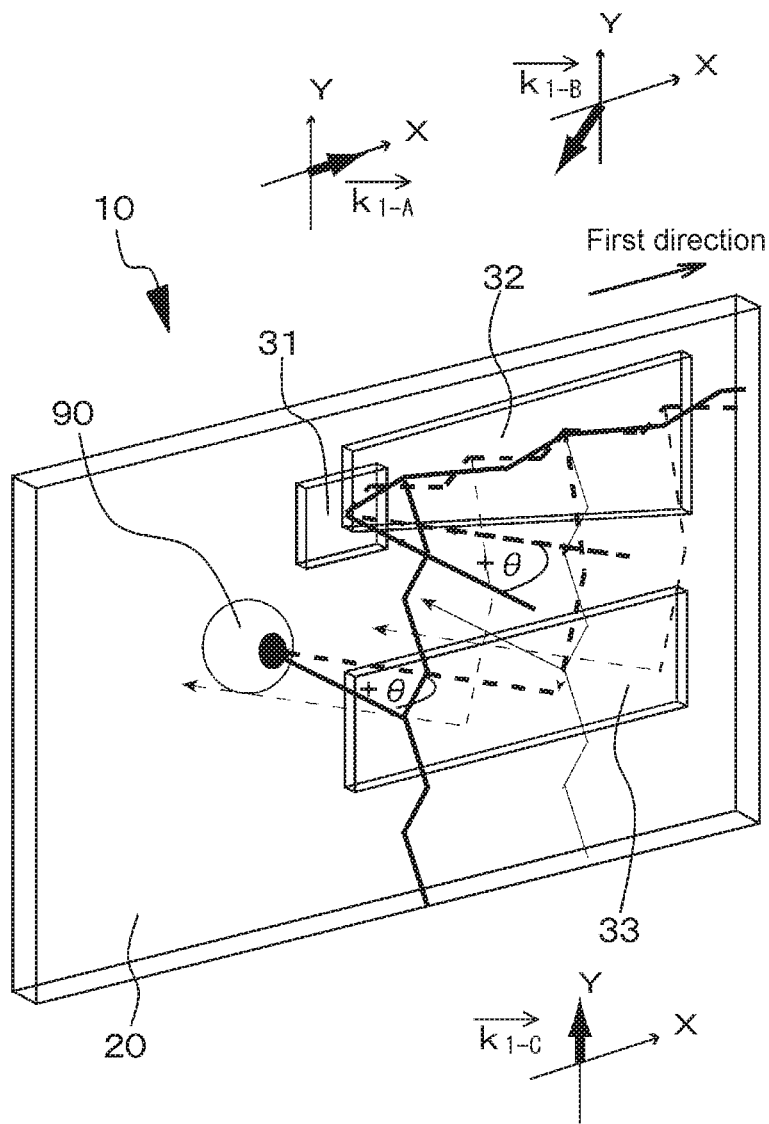
FIG. 2 is a schematic perspective view of a first deflecting unit constituting the optical device of the first embodiment.
Figure 3:
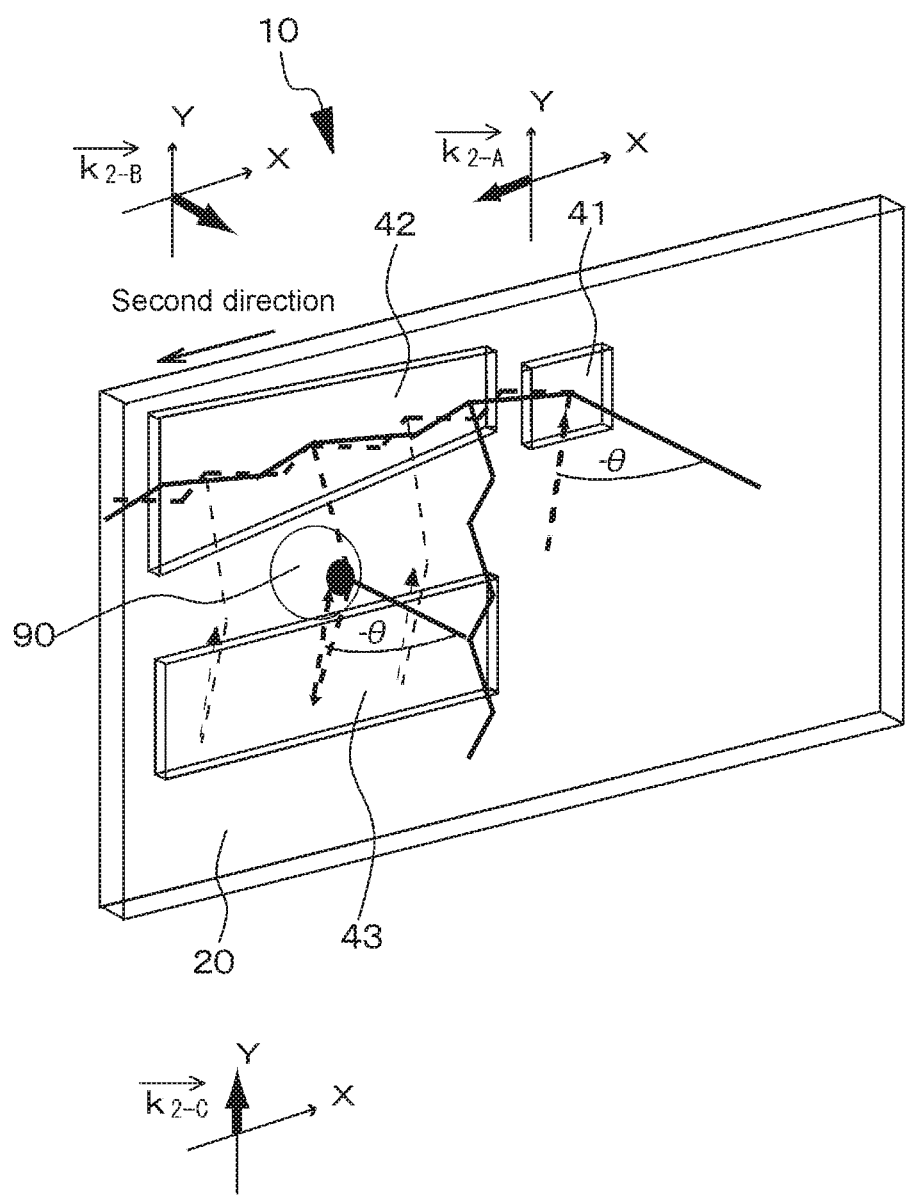
FIG. 3 is a schematic perspective view of a second deflecting unit constituting the optical device of the first embodiment.
Figure 4A:
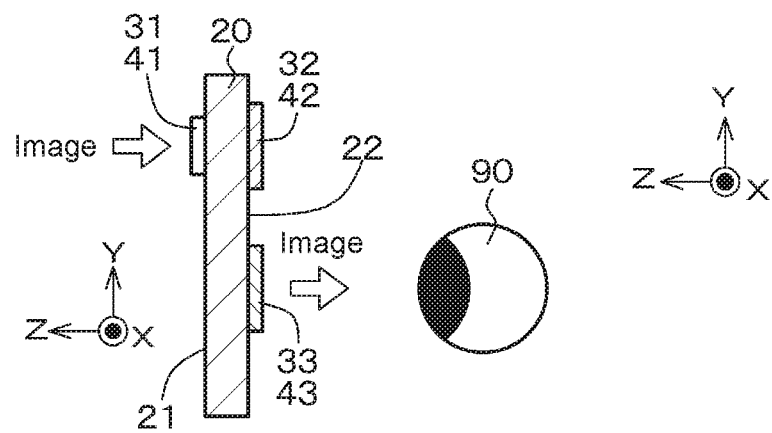
FIGS. 4A and 4B are respectively schematic cross-sectional views of the optical device of the first embodiment and schematic views of the optical device of the first embodiment seen from the side.
Figure 4B:
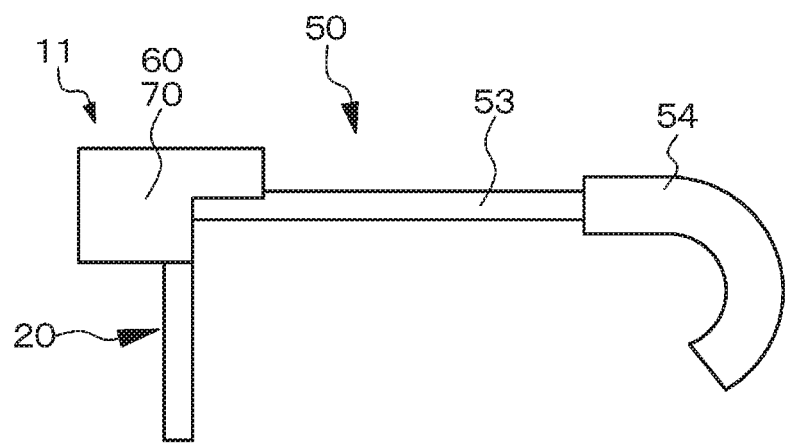
Figure 6:
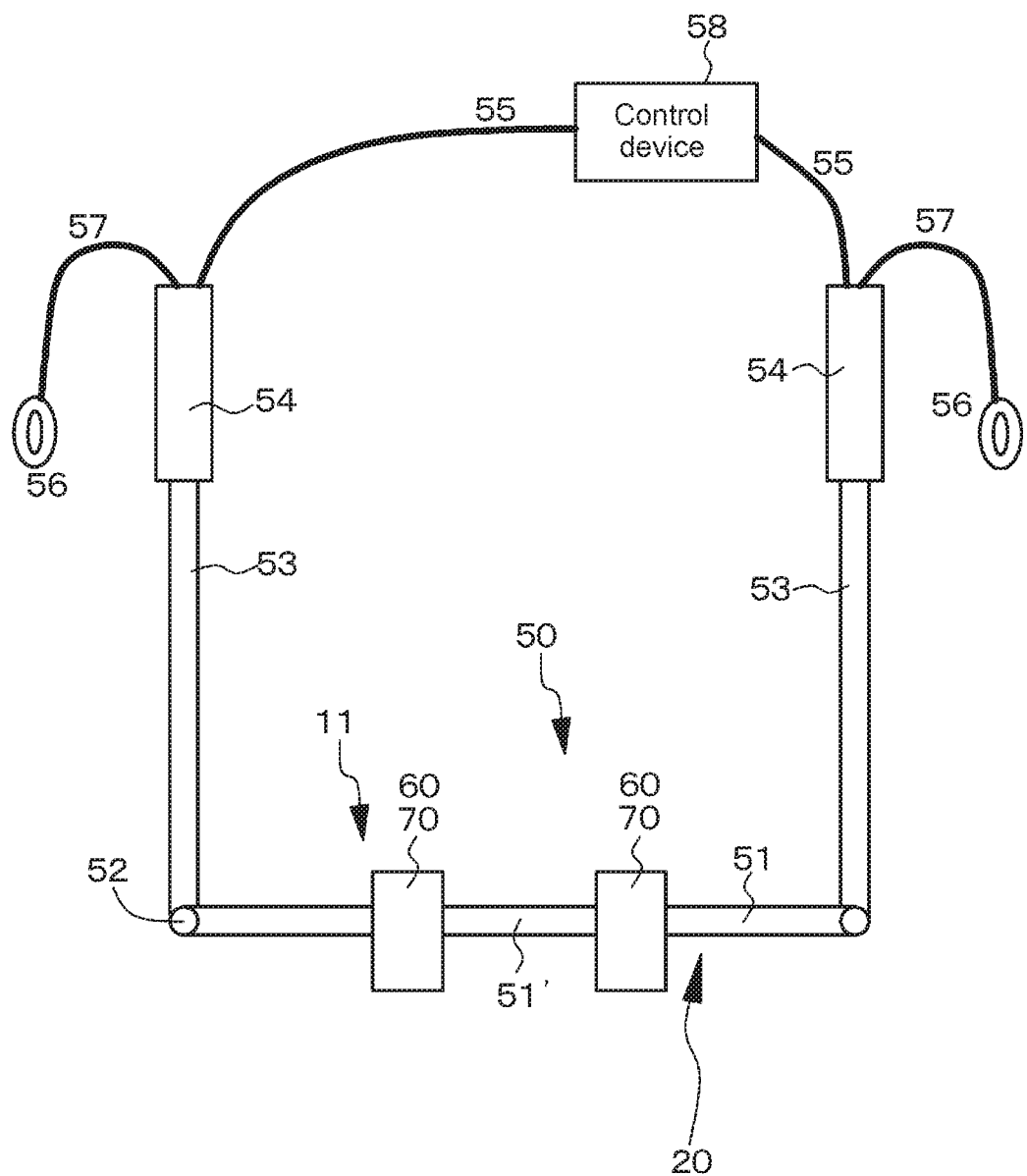
FIG. 6 is a schematic view of a display apparatus of the first embodiment seen from above.
Figure 7:
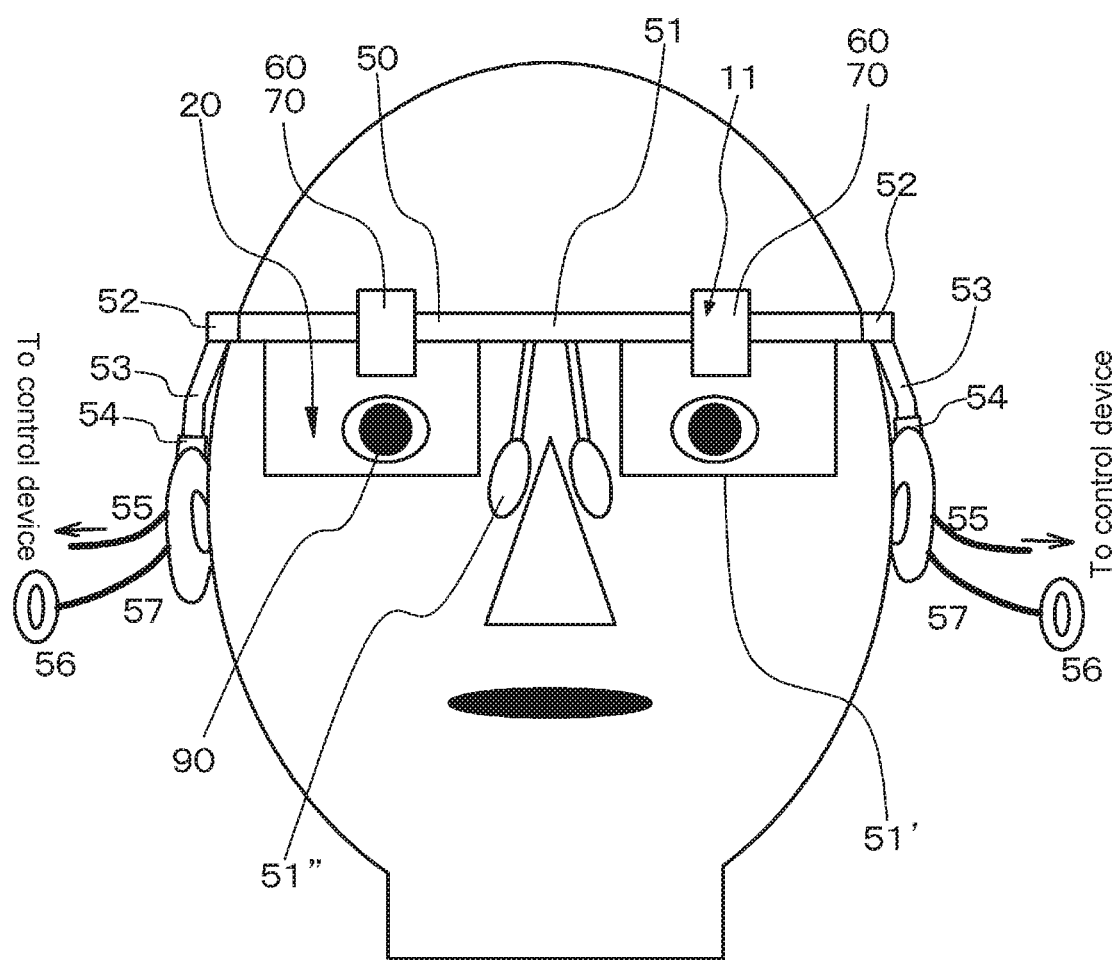
FIG. 7 is a schematic view of the display apparatus of the first embodiment seen from the front.

A first embodiment relates to an optical device of the present disclosure, an image display device of the present disclosure, and a display apparatus of the present disclosure. FIG. 1A is a schematic perspective view of an optical device of the first embodiment, and FIG. 1B is a schematic view of the optical device of the first embodiment seen from above. Further, FIG. 2 is a schematic perspective view of a first deflecting unit constituting the optical device of the first embodiment. FIG. 3 is a schematic perspective view of a second deflecting unit. FIG. 4A is a schematic cross-sectional view of the optical device of the first embodiment. FIG. 4B is a schematic view of the optical device of the first embodiment seen from the side. FIG. 6 is a schematic view of a display apparatus of the first embodiment seen from above. FIG. 7 is a schematic view of the display apparatus of the first embodiment seen from the front. Furthermore, FIGS. 10A, 10B, 11A, and 11B are conceptual diagrams of wave vectors and the like of a first A deflecting member, a first B deflecting member, and a first C deflecting member.

An optical device 10 of the first embodiment is an optical device, on which light emitted from an image forming device 60 is incident, in which the light is guided, and from which the light is emitted, the optical device including: a light guide plate 20; a first deflecting unit; and a second deflecting unit. The first deflecting unit includes a first A deflecting member 31, a first B deflecting member 32, and a first C deflecting member 33. The second deflecting unit includes a second A deflecting member 41, a second B deflecting member 42, and a second C deflecting member 43. Part of the light emitted from the image forming device 60 enters the first A deflecting member 31. The light incident on the first A deflecting member 31 is deflected by the first A deflecting member 31, enters the first B deflecting member 32 by total reflection inside of the light guide plate 20, is deflected by the first B deflecting member 32, enters the first C deflecting member 33 by total reflection inside of the light guide plate 20, is deflected by the first C deflecting member 33, and is emitted toward a pupil 90 of an observer. Further, at least remaining part of the light emitted from the image forming device 60 enters the second A deflecting member 41. The light incident on the second A deflecting member 41 is deflected by the second A deflecting member 41, enters the second B deflecting member 42 by total reflection inside of the light guide plate 20, is deflected by the second B deflecting member 42, enters the second C deflecting member 43 by total reflection inside of the light guide plate 20, is deflected by the second C deflecting member 43, and is emitted toward the pupil 90 of the observer. Furthermore, assuming that a direction obtained when a propagation direction of the light deflected by the first A deflecting member 31 is orthogonally projected on the light guide plate 20 is a first direction, and that a direction obtained when a propagation direction of the light deflected by the second A deflecting member 41 is orthogonally projected on the light guide plate 20 is a second direction, the first direction is opposite to the second direction.

Further, an image display device 11 of the first embodiment includes: an image forming device 60; and an optical device, on which light emitted from the image forming device 60 is incident, in which the light is guided, and from which the light is emitted, the optical device including the optical device 10 of the first embodiment.

Furthermore, a display apparatus of the first embodiment includes: a frame 50 to be mounted to a head of an observer; and an image display device 11 attached to the frame 50, the image display device 11 including an image forming device 60, and an optical device, on which light emitted from the image forming device 60 is incident, in which the light is guided, and from which the light is emitted, the optical device including the optical device 10 of the first embodiment.

Specifically, the display apparatus of the first embodiment is of a binocular type with two image display devices 11, but it may be of a monocular type with one image display device 11. The optical device 10 is a see-through type (semi-transmissive type). Further, the image forming device 60 displays a monochromatic image, but it is not limited thereto.

In the optical device 10 of the first embodiment, assuming that a point on the light guide plate 20, at which light emitted from the center point of an image forming region of the image forming device 60 collides with the light guide plate 20, is an origin O, an axis line of the light guide plate 20 that passes through the origin O and is directed toward the first direction is an X-axis, an axis in a thickness direction of the light guide plate 20 that passes through the origin O (an axis including the normal of the light guide plate 20 that passes through the origin O) is an Z-axis, and an axis that is orthogonal to the X-axis and the Z-axis is a Y-axis, the first deflecting unit and the second deflecting unit are disposed symmetrically to a YZ plane. Further, the light emitted from the center point of the image forming region of the image forming device 60 is incident perpendicularly to the first A deflecting member 31 and the second A deflecting member 41. However, the present disclosure is not limited thereto, and the light may enter the first A deflecting member 31 and the second A deflecting member 41 at a certain angle that is not perpendicular.

Figure 5A:
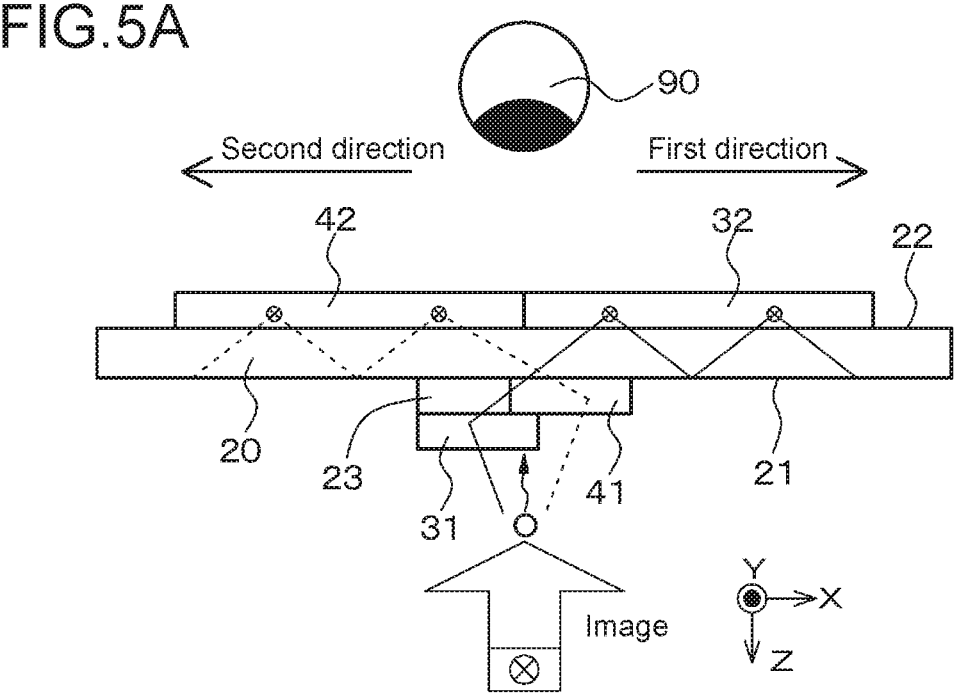
FIGS. 5A and 5B are respectively schematic views of optical devices of a second embodiment and a third embodiment seen from above.
Figure 5B:
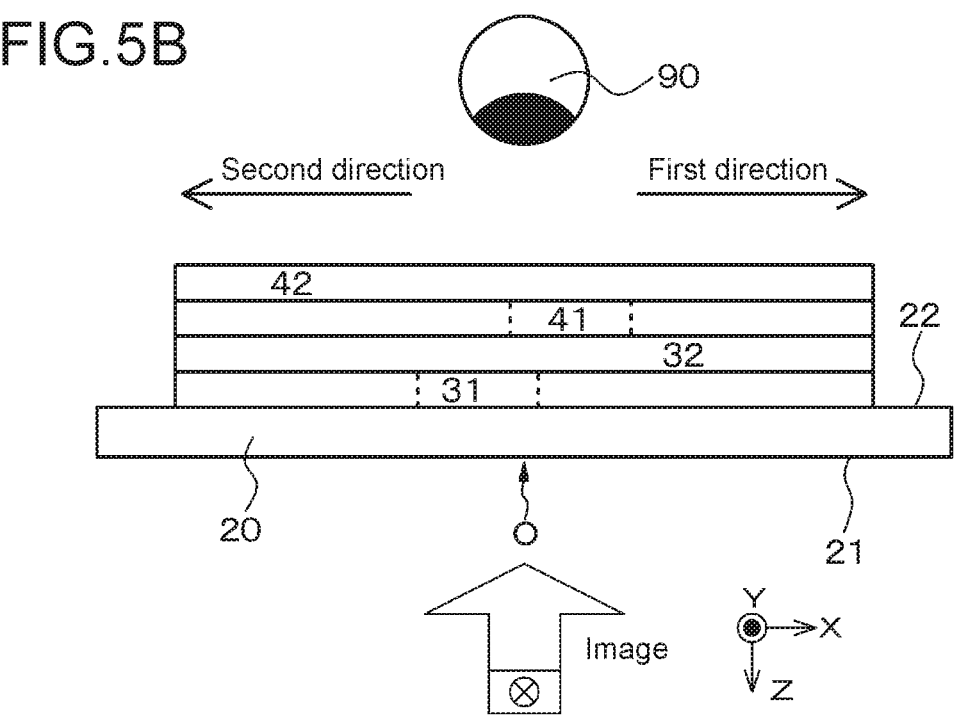

In the optical device 10 of the first embodiment, the first A deflecting member 31 has an end portion in the X direction, the second A deflecting member 41 has an end portion in the −X direction, and an end surface of the first A deflecting member 31 in the X direction and an end surface of the second A deflecting member 41 in the −X direction are in contact with each other. In the optical device of the first embodiment, specifically, the half of the light emitted from the image forming device 60 enters the first A deflecting member 31, and the remaining half of the light emitted from the image forming device 60 enters the second A deflecting member 41. In FIGS. 1B, 5A, and 5B, the light propagating through the first deflecting unit is indicated by a thin solid line, and the light propagating through the second deflecting unit is indicated by a thin dotted line. In addition, the light propagating from the top to the bottom of the figure is indicated by a symbol marked with a "x" in a circle. Furthermore, in FIG. 1A, light emitted from the center point of the image forming region of the image forming device 60, incident on the first A deflecting member 31 and the second A deflecting member 41, and emitted from the first C deflecting member 33 and the second C deflecting member 43 is indicated by a thick solid line, and light emitted from the image forming device 60 at an angle of view (θ) and an angle of view (−θ), incident on the first A deflecting member 31 and the second A deflecting member 41, and emitted from the first C deflecting member 33 and the second C deflecting member 43 is indicated by a thick dotted line. Further, in FIGS. 2 and 3, light emitted from the center point of the image forming region of the image forming device 60, incident on the first A deflecting member 31 and the second A deflecting member 41, totally reflected inside the light guide plate 20, and emitted from the first C deflecting member 33 and the second C deflecting member 43 is indicated by a thick solid line, and light emitted from the image forming region of the image forming device 60 at an angle of view (θ) and an angle of view (−θ), incident on the first A deflecting member 31 and the second A deflecting member 41, totally reflected inside the light guide plate 20, and emitted from the first C deflecting member 33 and the second C deflecting member 43 is indicated by a thick dotted line.

In the optical device 10 of the first embodiment, the first A deflecting member 31, the first B deflecting member 32, the first C deflecting member 33, the second A deflecting member 41, the second B deflecting member 42, and the second C deflecting member 43 each include a volume hologram diffraction grating. Here, the light guide plate 20 has two parallel surfaces (first surface 21 and second surface 22). The first surface 21 constitutes a light guide plate incident surface of the light guide plate 20, and the second surface 22 constitutes a light guide plate emission surface of the light guide plate 20. The first A deflecting member 31 and the second A deflecting member 41 each including a transmissive volume hologram diffraction grating are disposed (specifically, bonded) on the first surface 21 of the light guide plate 20, and the first B deflecting member 32, the first C deflecting member 33, the second B deflecting member 42, and the second C deflecting member 43 each including a reflective volume hologram diffraction grating are disposed (specifically, bonded) on the second surface 22 of the light guide plate 20. The first A deflecting member 31, the first B deflecting member 32, the first C deflecting member 33, the second A deflecting member 41, the second B deflecting member 42, and the second C deflecting member 43 each include a single grating layer. Interference fringes corresponding to one type of wavelength band (or wavelength) are formed in each deflecting member made of a photopolymer material and are manufactured by a conventional method. The pitch of the interference fringes formed in the deflecting member (diffractive optical element) is constant, and the interference fringes are linear. An inclination angle (slant angle) of the interference fringes may be constant in the volume hologram diffraction grating or may be changed depending on the value of the angle of view of the image incident on the volume hologram diffraction grating. In a case where the inclination angle of the interference fringes is changed depending on the value of the angle of view of the incident image, the inclination angle may be changed continuously or stepwisely. Further, it is favorable that the first A deflecting member 31 and the second A deflecting member 41 are designed such that the diffraction efficiency of the first A deflecting member 31 and the diffraction efficiency of the second A deflecting member 41 are continuously changed with the interface region between the end surface of the first A deflecting member 31 in the X direction and the end surface of the second A deflecting member 41 in the −X direction being interposed therebetween.

In order for the light incident on the first A deflecting member 31 and the second A deflecting member 41 to be totally reflected inside the light guide plate 20, the angle (incident angle) of the light, which propagates inside the light guide plate 20 and collides with the first surface 21 or the second surface 22 of the light guide plate 20, with respect to the first surface 21 or the second surface 22 is requested to be larger than the total-reflection angle. Therefore, for example, the incident angle of the light to the first A deflecting member 31 needs to satisfy $k^v \cdot \sin(\theta_{in}) + m \cdot k^v_{1-A} = k^v \cdot \sin(\theta_{diff})$. Moreover, $\theta_{diff}$ is requested to have a value larger than the total reflection angle. Here, $k^v$ represents a wave vector of incident light,
$\theta_1$ represents an incident angle,
$\theta_{diff}$ represents a diffraction angle, and
m represents an order.

Figure 14:
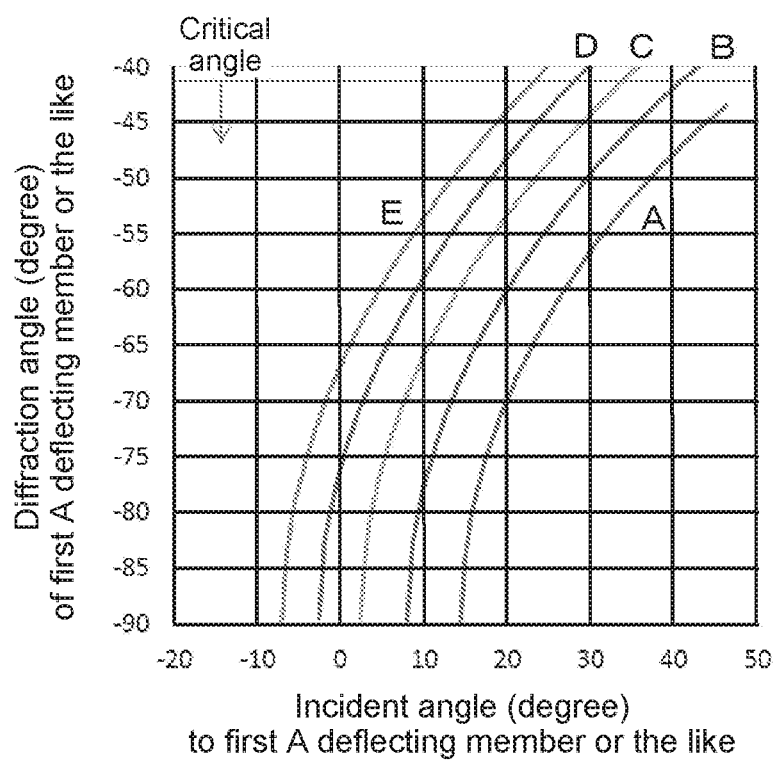
FIG. 14 is a graph showing a relationship between an incident angle of light to the first A deflecting member or a second A deflecting member and a diffraction angle of the first A deflecting member or the second A deflecting member, with a pitch d being as a parameter.

The diffraction angle with respect to the angle of view of the image is defined by an equation satisfying the Bragg condition to be described later, and is determined by a wavelength A and the pitch d of the grating surface. The graph of FIG. 14 shows a relationship between the incident angle of the light to the first A deflecting member 31 or the second A deflecting member 41 and the diffraction angle of the first A deflecting member 31 or the second A deflecting member 41, with the pitch d being as a parameter. In FIG. 14, "A" indicates data with a pitch d=300 nm, "B" indicates data with a pitch d=320 nm, "C" indicates data with a pitch d=340 nm, "D" indicates data with a pitch d=360 nm, and "E" indicates data with a pitch d=380 nm.

Incidentally, the diffraction angle $\theta_{diff}$ with respect to the angle of view of the image is expressed by the equation described above. In the case of the transmissive volume hologram diffraction grating, the value of m is favorably "−1" (−1 order), and the incident angle of view corresponds to a diffraction angle of −90 degrees from the total reflection angle (see FIG. 14). The first A deflecting member 31 and the second A deflecting member 41 share the angle of view in the X direction and the −X direction, respectively, but the angles of view in charge favorably overlap. The graph of FIG. 14 shows a relationship between the pitch d and the diffraction angle in the wavelength of 530 nm in the first A deflecting member 31 or the second A deflecting member 41. In this case, it is favorable to select a pitch at which the incident angle of view overlaps from 0 degrees, as in the case of "D" or "E". As the overlapping incident angle becomes larger, the angle of view that can reach the pupil becomes narrower, but the width of the deflecting member only needs to be set to be equal to the pitch of the total reflection. In this case, the width of the deflecting member may be set in consideration of the wavelength dispersion of the light source. For example, the width of the deflecting member (specifically, the width of the first A deflecting member 31 along the X direction, the width of the second A deflecting member 41 along the −X direction) only needs to be set so as to satisfy the following equation:

$$\text{Width of deflecting member} = Pt_{1r} = 2 \cdot T \cdot \tan(\theta_{diff})$$

where the thickness of the light guide plate is T, and the pitch of the total reflection of the light totally reflected inside the light guide plate is $Pt_{tr}$. For example, in a case where the wavelength full width at half maximum of a light source including an LED is 30 nm, it is favorable to calculate the range of 500 nm to 560 nm and to set the minimum width of the deflecting member or to set the maximum angle of the diffraction angle $\theta_{diff}$.

Here, it is favorable that all of the light deflected by the first A deflecting member 31 is incident on the first B deflecting member 32, all of the light deflected by the first B deflecting member 32 is incident on the first C deflecting member 33, all of the light deflected by the second A deflecting member 41 is incident on the second B deflecting member 42, and all of the light deflected by the second B deflecting member 42 is incident on the second C deflecting member 43. However, the light loss in the light guide plate 20 is excluded.

The light propagates by total reflection inside of the light guide plate 20 from the first A deflecting member or the like toward the first B deflecting member or the like, and thus the image incident on the light guide plate 20 is extended (enlarged) in the X-axis direction and the −X-axis direction. Further, the light propagates by total reflection inside of the light guide plate 20 from the first B deflecting member or the like toward the first C deflecting member or the like, and thus the image extended (enlarged) in the X-axis direction and the −X-axis direction is further extended in the −Y-axis direction. Thus, the image from the image forming device 60 is extended (enlarged) vertically and horizontally to reach the pupil 90 of the observer. Further, the parallel light from the image forming device 60 is diffracted (specifically, diffracted and reflected a plurality of times) by the first A deflecting member or the like and the first B deflecting member or the like, propagates through the inside of the light guide plate 20 by total reflection, and is emitted, as parallel light, from the second surface 22 of the light guide plate 20.

The following structure may also be provided: the surfaces of the first A deflecting member or the like, the first B deflecting member or the like, and the first C deflecting member or the like, which do not face the light guide plate 20, are coated with a transparent resin plate or a transparent resin film to prevent the first A deflecting member or the like, the first B deflecting member or the like, and the first C deflecting member or the like from being damaged. Further, transparent protective films may be bonded to the first surface 21 or the second surface 22 of the light guide plate 20 to protect the light guide plate 20.

In the illustrated example, the planar shape of the first A deflecting member or the like and the first C deflecting member or the like is rectangular, and the planar shape of the first B deflecting member or the like is a isosceles trapezoid. However, the planar shape of these members is not limited thereto. For example, the planar shape of the first A deflecting member or the like may be circular, and the planar shape of the first B deflecting member or the like may be rectangular. The planar shape of the light guide plate 20 can also be a shape in which the corners are cut out.

The wavelength of light (monochrome) emitted from the image forming device 60 was set to $\lambda_0=530$ nm. Further, the glass having a thickness of 1.0 mm (refractive index: 1.51) was used as the material constituting the light guide plate 20, and the average refractive index of the photopolymer material constituting the first A deflecting member or the like, the first B deflecting member or the like, and the first C deflecting member or the like was set to 1.51. Note that the thickness of the light guide plate 20 does not inherently contribute to widening of the angle of view of the display image, but a reduction in the thickness of the light guide plate 20 can achieve a reduction in the size of the first A deflecting member or the like and a miniaturization of the parallel light emitting optical system constituting the image forming device 60. An increase in the thickness of the light guide plate 20 can reduce the total number of reflections in the light guide plate 20 and allows a high-quality image to be projected by suppressing the reflection surface scattering. Thus, it is necessary to select the light guide plate 20 of an optimum thickness.

Further, in the optical device 10 of the first embodiment, the first A deflecting member 31 and the second A deflecting member 41 each include a volume hologram diffraction grating, and satisfy $$k^X_{1\text{-}A}+k^X_{2\text{-}A}=0,$$

$$k^Y_{1\text{-}A}=k^Y_{2\text{-}A}, \text{ and}$$

$$k^Z_{1\text{-}A}=k^Z_{2\text{-}A},$$

where a wave vector of the first A deflecting member 31 is $k^v_{1\text{-}A}$, an X component, a Y component, and a Z component of $k^v_{1\text{-}A}$ are $k^X_{1\text{-}A}$, $k^Y_{1\text{-}A}$, and $k^Z_{1\text{-}A}$, respectively, a wave vector of the second A deflecting member 41 is $k^v_{2\text{-}A}$, and an X component, a Y component, and a Z component of $k^v_{2\text{-}A}$ are $k^X_{2\text{-}A}$, $k^Y_{2\text{-}A}$, and $k^Z_{2\text{-}A}$, respectively. Furthermore, the first C deflecting member 33 and the second C deflecting member 43 may each include a volume hologram diffraction grating, and satisfy $$k^X_{1\text{-}C}+k^X_{2\text{-}C}=0,$$

$$k^Y_{1\text{-}C}=k^Y_{2\text{-}C}, \text{ and}$$

$$k^Z_{1\text{-}C}=k^Z_{2\text{-}C},$$

where a wave vector of the first C deflecting member 33 is $k^v_{1\text{-}C}$, an X component, a Y component, and a Z component of $k^v_{1\text{-}C}$ are $k^X_{1\text{-}C}$, $k^Y_{1\text{-}C}$, and $k^Z_{1\text{-}C}$, respectively, a wave vector of the second C deflecting member 43 is $k^v_{2\text{-}C}$, and an X component, a Y component, and a Z component of $k^v_{2\text{-}C}$ are $k^X_{2\text{-}C}$, $k^Y_{2\text{-}C}$, and $k^Z_{2\text{-}C}$, respectively. Furthermore, the first B deflecting member 32 and the second B deflecting member 42 may each include a volume hologram diffraction grating, and satisfy $$k^X_{1\text{-}B}+k^X_{2\text{-}B}=0,$$

$$k^Y_{1\text{-}B}=k^Y_{2\text{-}B}, \text{ and}$$

$$k^Z_{1\text{-}B}=k^Z_{2\text{-}C},$$

where a wave vector of the first B deflecting member 32 is $k^v_{1\text{-}B}$, an X component, a Y component, and a Z component of $k^v_{1\text{-}B}$ are $k^X_{1\text{-}B}$, $k^Y_{1\text{-}B}$, and $k^Z_{1\text{-}B}$, respectively, a wave vector of the second B deflecting member 42 is $k^v_{2\text{-}B}$, and an X component, a Y component, and a Z component of $k^v_{2\text{-}B}$ are $k^X_{2\text{-}B}$, $k^Y_{2\text{-}B}$, and $k^Z_{2\text{-}B}$, respectively. Furthermore, $$k^X_{1\text{-}A}+k^X_{1\text{-}B}=0,$$

$$k^Y_{1\text{-}B}+k^Y_{1\text{-}C}=0,$$

$$k^X_{2\text{-}A}+k^X_{2\text{-}B}=0, \text{ and}$$

$$k^Y_{2\text{-}B}+k^Y_{2\text{-}C}=0$$

may be satisfied. Furthermore, $$k^v_{1\text{-}A}+k^v_{1\text{-}B}+k^v_{1\text{-}C}=0, \text{ and}$$

$$k^v_{2\text{-}A}+k^v_{2\text{-}B}+k^v_{2\text{-}C}=0$$

may be satisfied.

Note that, in the examples shown in FIGS. 2, 3, 10A, and 10B, triangles formed by the wave vectors $k^v_{1\text{-}A}$, $k^v$1-B, $k^v1$-C conceptually illustrated are isosceles right triangles. For example, the value of grating periods $d_1$ and $d_3$ of the first A deflecting member or the like and the first C deflecting member or the like is 422 nm, and the value of a grating period $d_2$ of the first B deflecting member or the like is 422 nm/$2^{1/2}$=298 nm. In the examples shown in FIGS. 11A and 11B, the triangle is an inequilateral triangle. However, a triangle formed by the wave vector $k^v_{1-A} + k^v_{1-B} + k^v_{1-C}$ is not limited to these triangles.

Further, assuming that, with respect to the light emitted from the image forming device 60, the average diffraction efficiency of the first A deflecting member 31 is $\eta_{1-A}$, the average diffraction efficiency of the first B deflecting member 32 is $\eta_{1-B}$, and the average diffraction efficiency of the first C deflecting member 33 is $\eta_{1-C}$, $\eta_{1-B}/\eta_{1-A}<1$ and $\eta_{1-C}/\eta_{1-A}<1$ are satisfied. Assuming that, with respect to the light emitted from the image forming device 60, the average diffraction efficiency of the second A deflecting member 41 is $\eta_{2-A}$, the average diffraction efficiency of the second B deflecting member 42 is $\eta_{2-B}$, and the average diffraction efficiency of the second C deflecting member is $\eta_{2-C}$, $\eta_{2-3}/\eta_{2-A}<1$ and $\eta_{2-C}/\eta_{2-A}<1$ are satisfied.

Figure 8A:
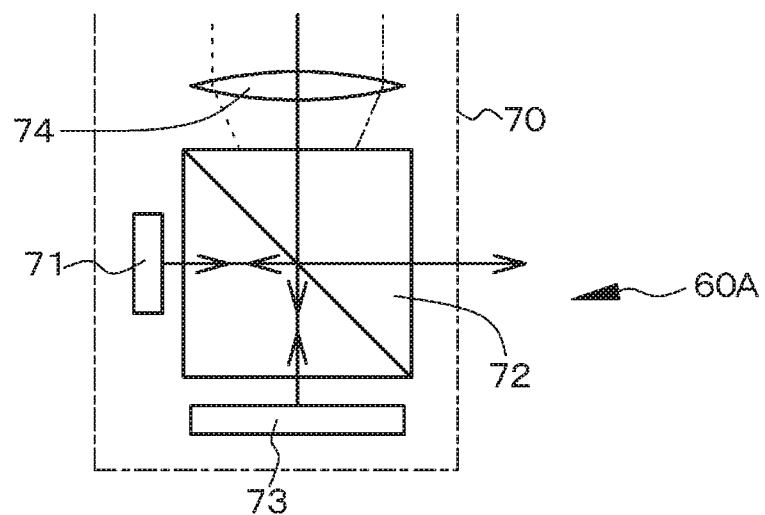
FIGS. 8A, 8B, and 8C are conceptual diagrams of an image forming device in the display apparatus of the first embodiment.

As shown in FIG. 8A, the image forming device 60 (hereinafter, the image forming device shown in FIG. 8A is referred to as an image forming device 60A) is the image forming device of the first configuration and includes a plurality of pixels arranged in a two-dimensional matrix. Specifically, the image forming device 60A includes a reflective spatial light modulator and a light source 71 constituted by a light emitting diode that emits white light. The entire image forming device 60A is housed in a housing 70 (indicated by a dashed line in FIG. 8A). An opening (not shown) is provided in the housing 70, and light is emitted from the optical system (parallel light emitting optical system, collimating optical system 74) via the opening. The housing 70 is attached to the upper portion of the front portion 51 by a mounting member (not shown). The reflective spatial light modulator includes a liquid crystal display (LCD) 73 including a LCOS as a light valve. Furthermore, a polarizing beam splitter 72 is provided to reflect part of the light from the light source 71 to be guided to the liquid crystal display device 73, and passes therethrough part of the light reflected by the liquid crystal display device 73 to be guided to the optical system 74. The liquid crystal display device 73 includes a plurality of (e.g., 640×480) pixels (liquid crystal cells, liquid crystal display elements) arranged in a two-dimensional matrix. The polarizing beam splitter 72 has a well-known configuration and structure. Non-polarized light emitted from the light source 71 collides with the polarizing beam splitter 72. In the polarizing beam splitter 72, a P-polarized component passes therethrough and is emitted outside the system. On the other hand, an S-polarized component is reflected by the polarizing beam splitter 72, enters the liquid crystal display device 73, is reflected inside the liquid crystal display device 73, and is emitted from the liquid crystal display device 73. Here, in the light emitted from the liquid crystal display device 73, the light emitted from a pixel for displaying "white" includes many P-polarized light components, and the light emitted from a pixel for displaying "black" includes many S-polarized light components. Thus, in the light emitted from the liquid crystal display device 73 and colliding with the polarizing beam splitter 72, the P-polarized light component passes through the polarizing beam splitter 72 and is guided to the optical system 74. On the other hand, the S-polarized component is reflected in the polarizing beam splitter 72 and returned to the light source 71. The optical system 74 includes, for example, a convex lens. In order to generate parallel light, the image forming device 60A (more specifically, the liquid crystal display device 73) is disposed at a position of the focal length in the optical system 74. An image emitted from the image forming device 60A enters the first A deflecting member 31 and the second A deflecting member 41 via light guiding means (not shown). The liquid crystal display device 73 includes a plurality of (e.g., 640×480) pixels (liquid crystal cells, liquid crystal display elements) arranged in a two-dimensional matrix.

Figure 8B:
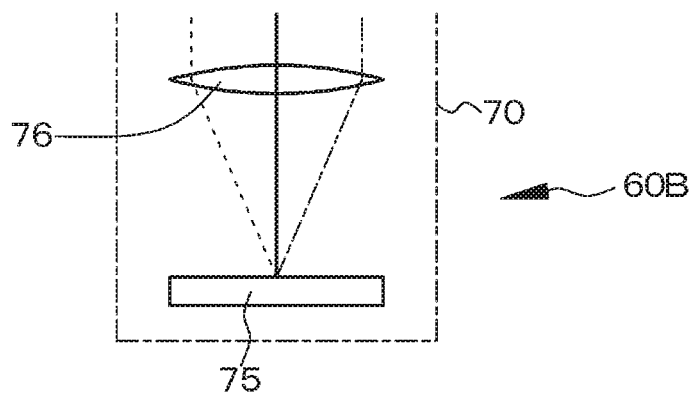

Alternatively, as shown in FIG. 8B, the image forming device 60 (hereinafter, the image forming device shown in FIG. 8B is referred to as an image forming device 60B) includes an organic EL display device 75. An image emitted from the organic EL display device 75 passes through a convex lens 76 to be parallel light, and is directed toward the first A deflecting member 31 and the second A deflecting member 41 via the light guide means (not shown). The organic EL display device 75 includes a plurality of (e.g., 640×480) pixels (organic EL elements) arranged in a two-dimensional matrix.

Figure 8C:
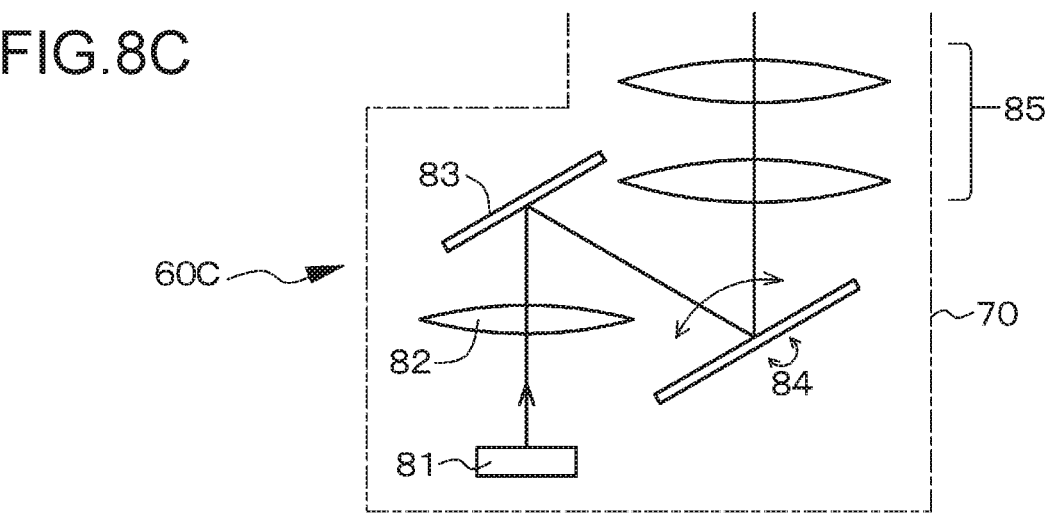

Alternatively, as shown in FIG. 8C, the image forming device 60 (hereinafter, the image forming device shown in FIG. 8C is referred to as an image forming device 60C), which is the image forming device of the second configuration, includes
  a light source 81,
  a collimating optical system 82 for collimating light emitted from the light source 81 to obtain parallel light,
  scanning means 84 for scanning the parallel light emitted from the collimating optical system 82, and
  a relay optical system 85 for relaying and emitting the parallel light scanned by the scanning means 84. Note that the entire image forming device 60C is housed in the housing 70 (indicated by a dashed line in FIG. 8C). An opening (not shown) is provided in the housing 70, and light is emitted from the relay optical system 85 via the opening. The housing 70 is attached to the upper portion of the front portion 51 by a mounting member (not shown). The light source 81 includes a light emitting element (LED) that emits green light. The light emitted from the light source 81 enters the collimating optical system 82 having a positive optical power as a whole and is emitted as parallel light. The parallel light is reflected by a total reflection mirror 83, subjected to horizontal and vertical scanning by the scanning means 84, which includes a MEMS in which micromirrors are rotatable in a two-dimensional direction and the incident parallel light can be two-dimensionally scanned, and then formed into a kind of two-dimensional image, and a virtual pixel (the number of pixels can be the same as that of the image forming device 60A, for example) is generated. The light from the virtual pixel passes through the relay optical system (parallel light emitting optical system) 85 constituted by a well-known relay optical system and enters the first A deflecting member 31 and the second A deflecting member 41 via the light guide means (not shown).

Figure 9A:
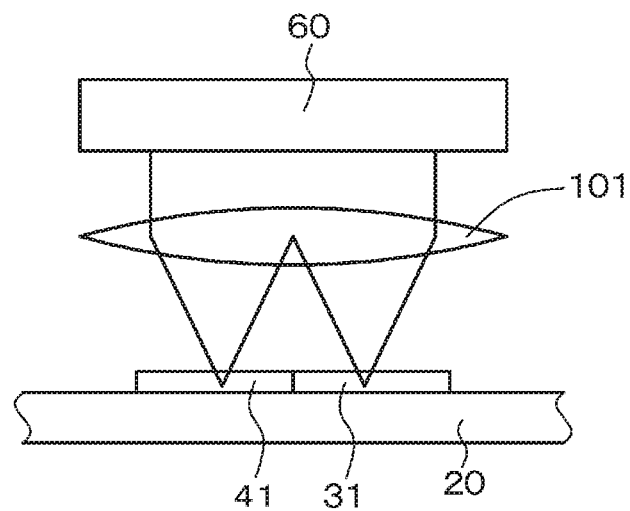
FIGS. 9A and 9B are conceptual diagrams of arrangements of the image forming device, a light guide plate, a first A deflecting member, a first B deflecting member, and the like in the optical device of the first embodiment.
Figure 9B:
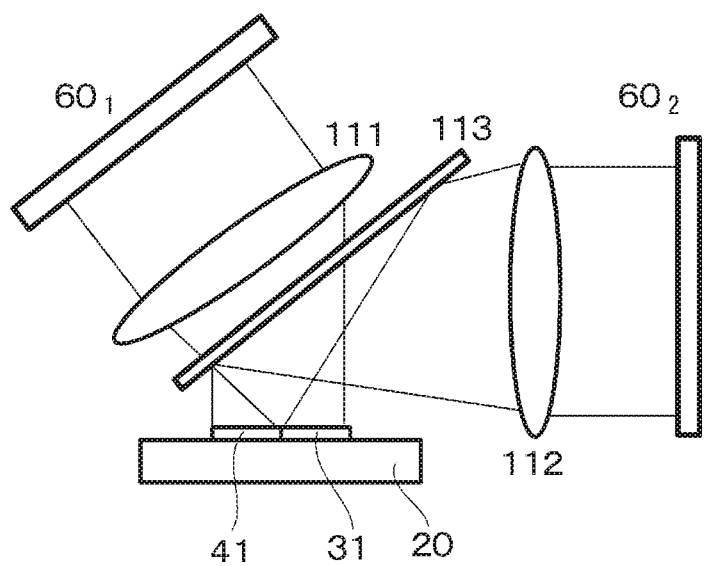
Figure 10A:
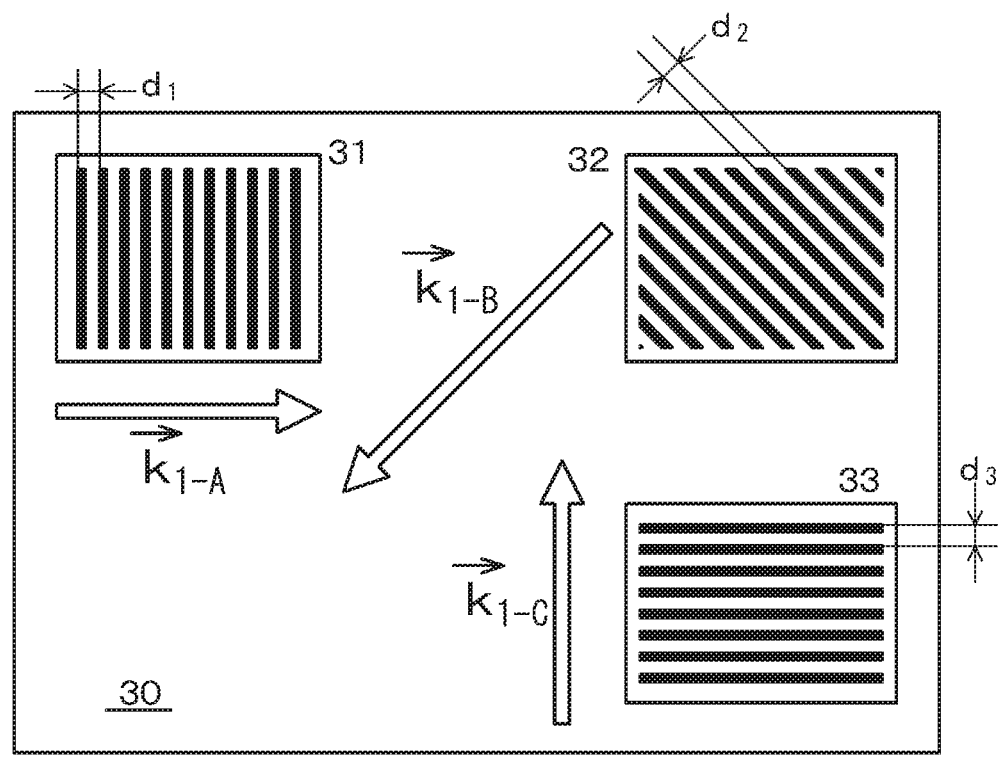
FIGS. 10A and 10B are conceptual diagrams of wave vectors or the like of the first A deflecting member, the first B deflecting member, and a first C deflecting member.
Figure 10B:
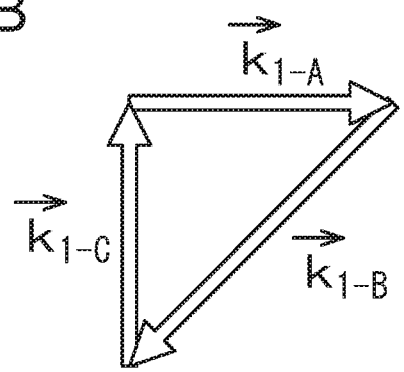
Figure 11A:
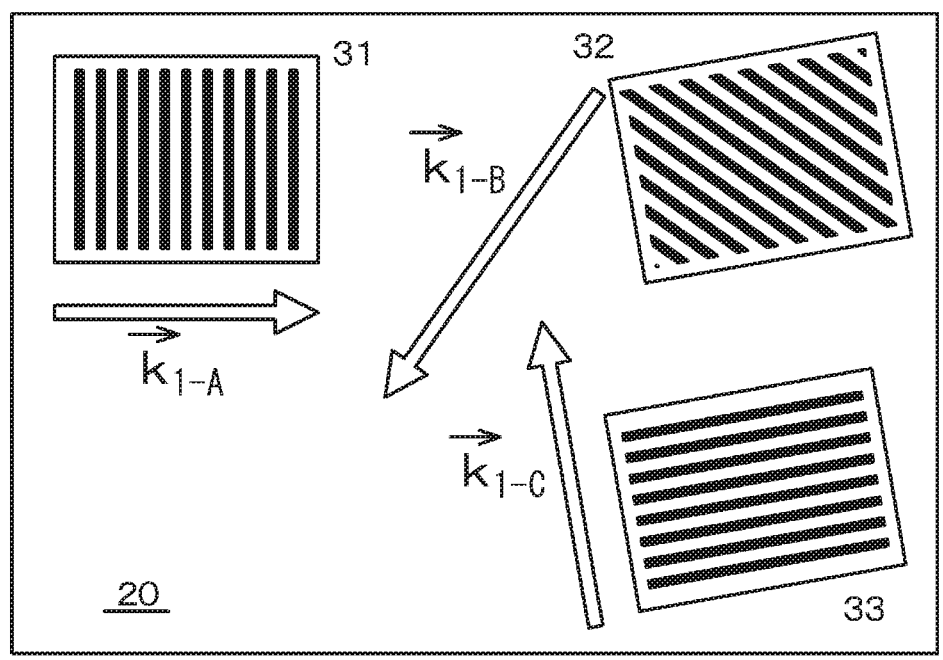
FIGS. 11A and 11B are conceptual diagrams of other wave vectors or the like of the first A deflecting member, the first B deflecting member, and the first C deflecting member.
Figure 11B:
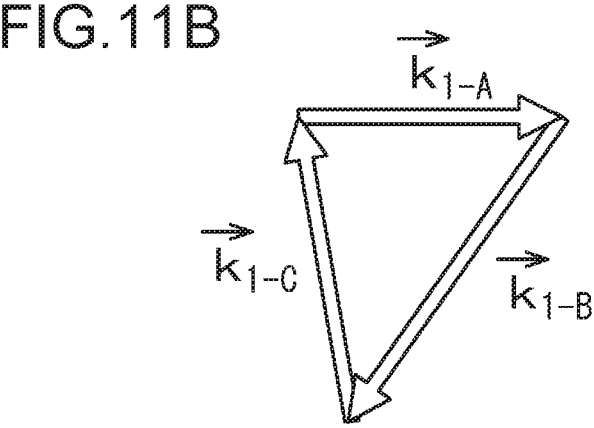

As shown in the conceptual diagram of FIG. 9A, the optical device includes one image forming device 60 (60A, 60B, 60C), and an image emitted from the image forming device 60 may be condensed by lenses 74, 76, 85 (represented by reference numeral 101 in the figure) to be caused to enter the first A deflecting member 31 and the second A deflecting member 41. The image emitted from the image generating device 60 enters the first A deflecting member 31 and the second A deflecting member 41 through the lens 101. At this time, the entrance pupil diameter of the lens 101 in the X-axis direction is favorably larger than the width in the X-axis direction of the first A deflecting member 31 and the second A deflecting member 41, and is more favorably the same as the width in the X-axis direction of the first A deflecting member 31 and the second A deflecting member 41. Alternatively, as shown in the conceptual diagram of FIG. 9B, the optical device includes two image forming devices $60_1$ and $60_2$, and may condense an image emitted from one image forming device $60_1$ by lenses 74, 76, 85 (represented by reference numeral 111 in the figure), cause the image to enter the first A deflecting member 31 through a half mirror 113, condense an image emitted from the other image forming device $60_2$ by lenses 74, 76, 85 (represented by reference numeral 112 in the figure), reflect the image by the half mirror 113, and cause the reflected image to enter the second A deflecting member 41. Note that in FIGS. 9A and 9B, the illustration of the deflecting members other than the first A deflecting member 31 and the second A deflecting member 41 is omitted.

The frame 50 includes a front portion 51 (including rim 51') disposed in front of the observer, two temple portions 53 pivotally attached at both ends of the front portion 51 through hinges 52, and a tip cell portion (also referred to as a tip cell, ear pad) 54 attached to the distal end of each temple portion 53. Further, a nose pad 51" is attached. That is, the assembly of the frame 50 and the nose pad 51" basically has substantially the same structure as that of ordinary glasses. Furthermore, as described above, each housing 70 is attached to the front portion 51 by a mounting member (not shown). The frame 50 is made of metal or plastic. Note that each housing 70 may be detachably attached to the front portion 51 by the mounting member.

Furthermore, wiring (signal line, power line, or the like, part of which is not shown) 55 extending from one of the image forming devices 60 extends from the distal end portion of the tip cell portion 54 to the outside through the inside of the temple portion 53 and the tip cell portion 54, and is connected to a control device (control circuit, control means) 58. Furthermore, each of the image forming devices 60 includes a headphone portion 56, and headphone portion wiring 57 extending from each of the image forming devices 60 extends from the distal end portion of the tip cell portion 54 to the headphone portion 56 through the inside of the temple portion 53 and the tip cell portion 54. More specifically, the headphone portion wiring 57 (part of which is not shown) extends from the distal end of the tip cell portion 54 to the headphone portion 56 so as to come around behind the rear side of the pinna (earshell). Such a configuration does not give an impression of the randomly disposed headphone portion 56 and headphone portion wiring 57 and can provide a clear display device.

The optical device of the first embodiment, the optical device constituting the image display device of the first embodiment, and the optical device constituting the display apparatus of the first embodiment each include the first deflecting unit and the second deflecting unit, and part (e.g., half) of the image emitted from the image forming device enters the first deflecting unit, and at least the remaining part (e.g., the remaining half) of the image emitted from the image forming device enters the second deflecting unit. That is, the image is divided in a way by the first A deflecting member and the second A deflecting member. The divided images are finally emitted from the first deflecting unit and the second deflecting unit and synthesized, i.e., the images emitted from the first C deflecting member and the second C deflecting member are synthesized to reach the pupil of the observer. Therefore, for example, an angle of view that is twice the angle of view of an image in a conventional optical device can be obtained. That is, it is possible to provide an optical device having a configuration or structure capable of achieving a much wider angle of view, an image display device including such an optical device, and a display apparatus including such an image display device.

SECOND EMBODIMENT

A second embodiment is a modification of the first embodiment. As shown in FIG. 5A of a schematic view of an optical device of the second embodiment seen from above, part of the light emitted from the image forming device 60 and incident on the first A deflecting member 31 enters the second A deflecting member 41. That is, the first A deflecting member 31 and the second A deflecting member 41 partially overlap. Specifically, the first A deflecting member 31 has an end portion in the X direction, the second A deflecting member 41 has an end portion in the −X direction, and the end portion of the first A deflecting member 31 in the X direction and the end portion of the second A deflecting member 41 in the −X direction overlap. In the illustrated example, a support member 23 is disposed on the first surface 21 of the light guide plate 20. The end surface of the second A deflecting member 41 in the −X direction is in contact with the support member 23. The first A deflecting member 31 is disposed on the second A deflecting member 41 and the support member 23. The light passing through the first A deflecting member 31 and diffracted and reflected by the second A deflecting member 41 does not satisfy the Bragg condition in the first A deflecting member 31, and is thus not diffracted and reflected in the first A deflecting member 31.

That is, specifically, in the second embodiment, the light emitted from the image forming device 60 has three forms.
(1) Enter the first deflecting unit of the optical device.
(2) Enter the second deflecting unit without entering the first deflecting unit of the optical device.
(3) Enter the first deflecting unit of the optical device, pass through the first deflecting unit, and enter the second deflecting unit.

Here, in the case of (3), the light entering the first deflecting unit of the optical device propagates through the first A deflecting member 31, the first B deflecting member 32, and the first C deflecting member 33 and passes through the first deflecting unit of the optical device. The light entering the second deflecting unit propagates through the second A deflecting member 41, the second B deflecting member 42, and the second C deflecting member 43.

Here, the volume hologram diffraction grating includes interference fringes having an inclination angle (slant angle) p. The inclination angle θ refers to the angle formed by the interference fringes and the surface of the volume hologram diffraction grating. The interference fringes are formed from the interior to the surface of the volume hologram diffraction grating. The interference fringes satisfy the Bragg condition. The Bragg condition in a reflective volume hologram diffraction grating refers to a condition satisfying the following equation (A). In the equation (A), m is a positive integer, λ is a wavelength, d is the pitch of the lattice plane (distance in normal direction of imaginary plane including interference fringes), and Θ is the complementary angle of the angle incident on the interference fringes. Further, when the light enters the diffraction grating member at an incident angle ψ, a relationship between 8, the inclination angle φ, and the incident angle ψ is as shown in equation (B).

$$m \cdot \lambda = 2 \cdot d \cdot \sin(\Theta) \qquad (A)$$

$$\Theta = 90° - (\varphi + \psi) \qquad (B)$$

Thus, the first A deflecting member 31 and the second A deflecting member 41 partially overlap, and thus it is possible to reliably prevent a cut line from being generated at the central portion of the image.

Further, the diffraction efficiencies can be improved by selecting the pitch d such that the range of the diffraction angle in the first A deflecting member 31 and the second A deflecting member 41 overlaps the range of the diffraction angle in the first C deflecting member 33 and the second C deflecting member 43, setting the pitch d of the first A deflecting member 31 and the second A deflecting member 41 to be equal, setting the pitch d of the first B deflecting member 32 and the second B deflecting member 42 to be equal, setting the pitch d of the first C deflecting member 33 and the second C deflecting member 43 to be equal, and making the range of the diffraction angle of the first A deflecting member 31 and the second A deflecting member 41 and the range of the diffraction angle of the first C deflecting member 33 and the second C deflecting member 43 overlap.

Except for the above points, the configurations and structures of the optical device, the image display device, and the display apparatus of the second embodiment can be similar to those of the optical device, the image display device, and the display apparatus of the first embodiment, and thus detailed description thereof will be omitted.

THIRD EMBODIMENT

A third embodiment is a modification of the first and second embodiments. As shown in FIG. 5B of a schematic view of an optical device of the third embodiment seen from above, the first A deflecting member 31 and the first B deflecting member 32 are laminated, and the second A deflecting member 41 and the second B deflecting member 42 are laminated. Further, in the illustrated example, similarly to the second embodiment, part of the light emitted from the image forming device 60 and incident on the first A deflecting member 31 enters the second A deflecting member 41. That is, the first A deflecting member 31 and the second A deflecting member 41 partially overlap. The light passing through the first A deflecting member 31 and the first B deflecting member 32 and diffracted and reflected by the second A deflecting member 41 does not satisfy the Bragg condition in the first A deflecting member 31 and the first B deflecting member 32, and is thus not diffracted and reflected in the first A deflecting member 31 and the first B deflecting member 32. That is, the light passing through a certain deflecting member is diffracted and reflected in another deflecting member that the light enters, if satisfying the Bragg condition, and is not diffracted and reflected if not satisfying the Bragg condition.

Except for the above points, the configurations and structures of the optical device, the image display device, and the display apparatus of the third embodiment can be similar to those of the optical device, the image display device, and the display apparatus of the first and second embodiments, and thus detailed description thereof will be omitted.

Note that the following form can also be provided, in which the first B deflecting member 32 and the first C deflecting member 33 are laminated, and the second B deflecting member 42 and the second C deflecting member 43 are laminated, or in which the first A deflecting member 31, the first B deflecting member 32, and the first C deflecting member 33 are laminated, and the second A deflecting member 41, the second B deflecting member 42, and the second C deflecting member 43 are laminated.

While the present disclosure has been described above on the basis of the favorable embodiments, the present disclosure is not limited to these embodiments. The configurations and structures of the display apparatus (head-mounted display), the image display device, and the optical device described in the embodiments are exemplary and can be appropriately changed. The deflecting member can also be a reflective blazed diffraction grating element. Further, the display apparatus of the present disclosure can also be used as a stereoscopic display apparatus. In this case, if necessary, a polarizing plate or a polarizing film may be detachably attached to the optical device, or a polarizing plate or a polarizing film may be bonded to the optical device. The image display device may include a dimmer. That is, the optical device may overlap at least part of the dimmer. More specifically, at least the first C deflecting member or the like of the optical device favorably overlaps with the dimmer.

On the material of one volume hologram diffraction grating, the first A deflecting member or the like and the first B deflecting member or the like may be formed; the first A deflecting member or the like and the first C deflecting member or the like may be formed; the first B deflecting member or the like and the first C deflecting member or the like may be formed; or the first A deflecting member or the like, the first B deflecting member or the like, the first C deflecting member or the like, and the first B deflecting member or the like may be formed. A hologram region may be formed on the light guide plate by using an imprint method or etching method.

Figure 12A:
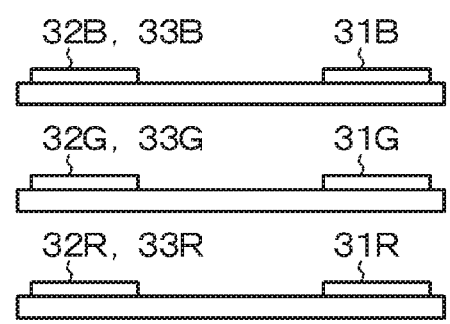
FIGS. 12A, 12B, and 12C are conceptual diagrams of modified examples of the optical device of the first embodiment.
Figure 12B:
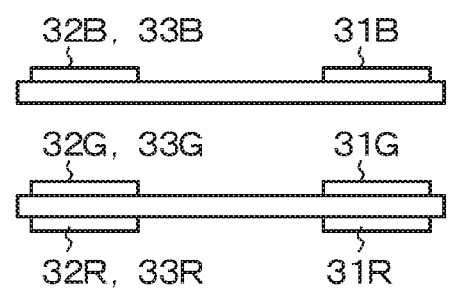
Figure 12C:
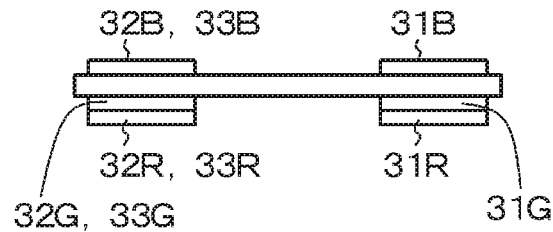

In the embodiments, the image forming device 60 has been described as displaying an image of a single color (e.g., green), but the image forming device 60 may also display a color image. In this case, the light source only needs to be constituted by a light source that emits each of red, green, and blue light, for example. Specifically, for example, red light, green light, and blue light emitted respectively from a red light emitting element, a green light emitting element, and a blue light emitting element may be mixed and made uniform in luminance by using a light pipe, to obtain white light. As shown in the conceptual diagram of an optical device in FIG. 12A, the following structure may be adopted, in which: a first A deflecting member or the like 31R, a first B deflecting member or the like 32R, and a first C deflecting member or the like 33R, which are each made of a diffraction grating layer of a volume hologram diffraction grating for diffracting and reflecting light having a red wavelength band (or wavelength), are disposed on a first light guide plate; a first A deflecting member or the like 31G, a first B deflecting member or the like 32G, and a first C deflecting member or the like 33G, which are each made of a volume hologram diffraction grating for diffracting light having a green wavelength band (or wavelength), are disposed on a second light guide plate; a first A deflecting member or the like 31B, a first B deflecting member or the like 32B, and a first C deflecting member or the like 33B, which are each made of a diffraction grating layer of a volume hologram diffraction grating for diffracting light having a blue wavelength band (or wavelength), are disposed on a third light guide plate; and the first, second, and third light guide plates are laminated with gaps therebetween. Alternatively, as shown in the conceptual diagram of an optical device in FIG. 12B, the following structure may be adopted, in which: a first A deflecting member or the like 31R, a first B deflecting member or the like 32R, and a first C deflecting member or the like 33R, which are each made of a diffraction grating layer of a volume hologram diffraction grating for diffracting and reflecting light having a red wavelength band (or wavelength), are disposed on one surface of the first light guide plate; a first A deflecting member or the like 31G, a first B deflecting member or the like 32G, and a first C deflecting member or the like 33G, which are each made of a diffraction grating layer of a volume hologram diffraction grating for diffracting light having a green wavelength band (or wavelength), are disposed on the other surface of the first light guide plate; a first A deflecting member or the like 31B, a first B deflecting member or the like 32B, and a first C deflecting member or the like 33B, which are each made of a diffraction grating layer of a volume hologram diffraction grating for diffracting light having a blue wavelength band (or wavelength), are disposed on the second light guide plate; and the first and second light guide plates are laminated with gaps therebetween. Alternatively, as shown in the conceptual diagram of an optical device in FIG. 12C, the following structure may be adopted, in which: a first A deflecting member or the like 31G, a first B deflecting member or the like 32G, and a first C deflecting member or the like 33G, which are each made of a diffraction grating layer of a volume hologram diffraction grating for diffracting light having a green wavelength band (or wavelength), are disposed on one surface of the first light guide plate; a first A deflecting member or the like 31R, a first B deflecting member or the like 32R, and a first C deflecting member or the like 33R, which are each made of a diffraction grating layer of a volume hologram diffraction grating for diffracting and reflecting light having a red wavelength band (or wavelength), are laminated on the first A deflecting member or the like 31G, the first B deflecting member or the like 32G, and the first C deflecting member or the like 33G; and a first A deflecting member or the like 31B, a first B deflecting member or the like 32B, and a first C deflecting member or the like 33B, which are each made of a diffraction grating layer of a volume hologram diffraction grating for diffracting light having a blue wavelength band (or wavelength), are disposed on the other surface of the first light guide plate.

Figure 13A:
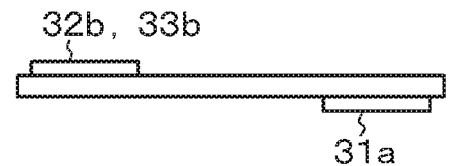
FIGS. 13A, 13B, 13C, 13D, 13E, 13F, 13G, and 13H are conceptual diagrams of other modified examples of the optical device of the first embodiment.
Figure 13B:
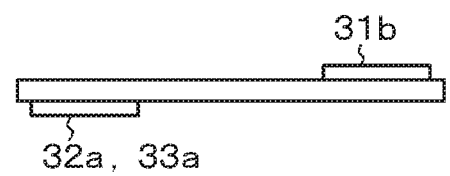
Figure 13C:
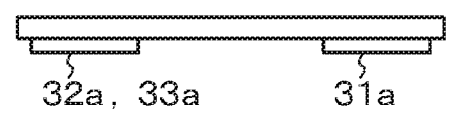
Figure 13D:
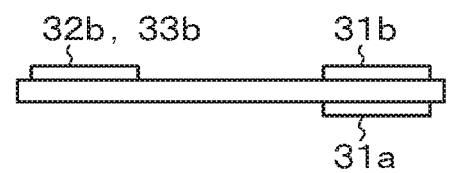
Figure 13E:
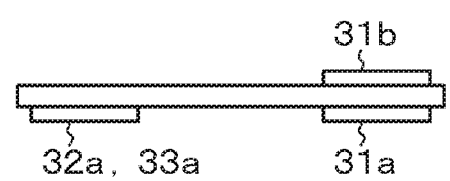
Figure 13F:
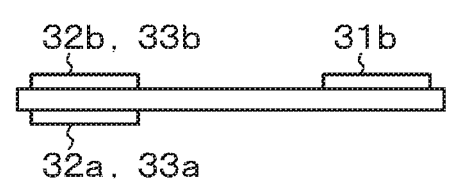
Figure 13G:
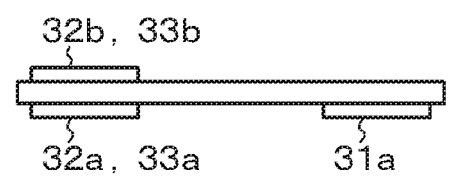
Figure 13H:
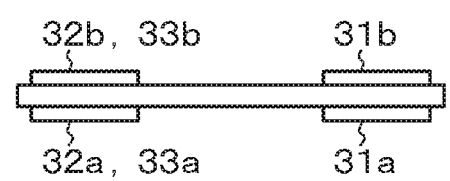

Alternatively, the conceptual diagram of the modified example of the optical device described in the first embodiment may be modified as will be described below with reference to FIGS. 13A, 13B, 13C, 13D, 13E, 13F, 13G, and 13H. That is, as shown in FIG. 13A, a first A deflecting member or the like 31*a* made of a transmissive volume hologram diffraction grating may be disposed on a first surface of a light guide plate, and a first B deflecting member or the like 32*b* and a first C deflecting member or the like 33*b* each made of a reflective volume hologram diffraction grating may be disposed on a second surface of the light guide plate. Alternatively, as shown in FIG. 13B, a first B deflecting member or the like 32*a* and a first C deflecting member or the like 33*a* each made of a transmissive volume hologram diffraction grating may be disposed on the first surface of the light guide plate, and a first A deflecting member or the like 31*b* made of a reflective volume hologram diffraction grating may be disposed on the second surface of the light guide plate. Alternatively, as shown in FIG. 13C, a first A deflecting member or the like 31*a*, a first B deflecting member or the like 32*a*, and a first C deflecting member or the like 33*a* each made of a transmissive volume hologram diffraction grating may be disposed on the first surface of the light guide plate. Alternatively, as shown in FIG. 13D, a first A deflecting member or the like 31*a* made of a transmissive volume hologram diffraction grating may be disposed on the first surface of the light guide plate, and a first A deflecting member or the like 31*b*, a first B deflecting member or the like 32*b*, and a first C deflecting member or the like 33*b* each made of a reflective volume hologram diffraction grating may be disposed on the second surface of the light guide plate. Alternatively, as shown in FIG. 13E, a first A deflecting member or the like 31*a*, a first B deflecting member or the like 32*a*, and a first C deflecting member or the like 33*a* each made of a transmissive volume hologram diffraction grating may be disposed on the first surface of the light guide plate, and a first A deflecting member or the like 31*b* made of a reflective volume hologram diffraction grating may be disposed on the second surface of the light guide plate. Alternatively, as shown in FIG. 13F, a first B deflecting member or the like 32*a* and a first C deflecting member or the like 33*a* each made of a transmissive volume hologram diffraction grating may be disposed on the first surface of the light guide plate, and a first A deflecting member or the like 31*b*, a first B deflecting member or the like 32*b*, and a first C deflecting member or the like 33*b* each made of a reflective volume hologram diffraction grating may be disposed on the second surface of the light guide plate. Alternatively, as shown in FIG. 13G, a first A deflecting member or the like 31*a*, a first B deflecting member or the like 32*a*, and a first C deflecting member or the like 33*a* each made of a transmissive volume hologram diffraction grating may be disposed on the first surface of the light guide plate, and a first B deflecting member or the like 32*b* and a first C deflecting member or the like 33*b* each made of a reflective volume hologram diffraction grating may be disposed on the second surface of the light guide plate. Alternatively, as shown in FIG. 13H, a first A deflecting member or the like 31*a*, a first B deflecting member or the like 32*a*, and a first C deflecting member or the like 33*a* each made of a transmissive volume hologram diffraction grating may be disposed on the first surface of the light guide plate, and a first A deflecting member or the like 31*b*, a first B deflecting member or the like 32*b*, and a first C deflecting member or the like 33*b* each made of a reflective volume hologram diffraction grating may be disposed on the second surface of the light guide plate.

Note that the present disclosure can also have the following configurations.

[A01] <Display Apparatus>

An optical device, on which light emitted from an image forming device is incident, in which the light is guided, and from which the light is emitted, the optical device including:

a light guide plate;

a first deflecting unit; and a second deflecting unit, in which the first deflecting unit includes a first A deflecting member, a first B deflecting member, and a first C deflecting member, the second deflecting unit includes a second A deflecting member, a second B deflecting member, and a second C deflecting member, part of the light emitted from the image forming device enters the first A deflecting member, the light incident on the first A deflecting member is deflected by the first A deflecting member, enters the first B deflecting member by total reflection inside of the light guide plate, is deflected by the first B deflecting member, enters the first C deflecting member by total reflection inside of the light guide plate, is deflected by the first C deflecting member, and is emitted toward a pupil of an observer, at least remaining part of the light emitted from the image forming device enters the second A deflecting member, the light incident on the second A deflecting member is deflected by the second A deflecting member, enters the second B deflecting member by total reflection inside of the light guide plate, is deflected by the second B deflecting member, enters the second C deflecting member by total reflection inside of the light guide plate, is deflected by the second C deflecting member, and is emitted toward the pupil of the observer, and assuming that a direction obtained when a propagation direction of the light deflected by the first A deflecting member is orthogonally projected on the light guide plate is a first direction, and that a direction obtained when a propagation direction of the light deflected by the second A deflecting member is orthogonally projected on the light guide plate is a second direction, the first direction is opposite to the second direction.

[A02] The optical device according to [A01], in which
assuming that
a point on the light guide plate, at which light emitted from the center point of an image forming region of the image forming device collides with the light guide plate, is an origin,
an axis line of the light guide plate that passes through the origin and is directed toward the first direction is an X-axis,
an axis in a thickness direction of the light guide plate that passes through the origin is an Z-axis, and
an axis that is orthogonal to the X-axis and the Z-axis is a Y-axis,
the first deflecting unit and the second deflecting unit are disposed symmetrically to a YZ plane.

[A03] The optical device according to [A01] or [A02], in which
the first A deflecting member and the second A deflecting member each include a volume hologram diffraction grating, and satisfy $$k^X_{1\text{-}A}+k^X_{2\text{-}A}=0,$$

$$k^Y_{1\text{-}A}=k^Y_{2\text{-}A}, \text{ and}$$

$$k^Z_{1\text{-}A}=k^Z_{2\text{-}A},$$

where
a wave vector of the first A deflecting member is $k^v_{1\text{-}A}$,
an X component, a Y component, and a Z component of $k^v_{1\text{-}A}$ are $k^X_{1\text{-}A}$, $k^Y_{1\text{-}A}$, and $k^Z_{1\text{-}A}$, respectively,
a wave vector of the second A deflecting member is $k^v_{2\text{-}A}$, and
an X component, a Y component, and a Z component of $k^v_{2\text{-}A}$ are $k^X_{2\text{-}A}$, $k^Y_{2\text{-}A}$, and $k^Z_{2\text{-}A}$, respectively.

[A04] The optical device according to [A03], in which
the first C deflecting member and the second C deflecting member each include a volume hologram diffraction grating, and satisfy $$k^X_{1\text{-}C}+k^X_{2\text{-}C}=0,$$

$$k^Y_{1\text{-}C}=k^Y_{2\text{-}C}, \text{ and}$$

$$k^Z_{1\text{-}C}=k^Z_{2\text{-}C},$$

where
a wave vector of the first C deflecting member is $k^v_{1\text{-}C}$,
an X component, a Y component, and a Z component of $k^v_{1\text{-}C}$ are $k^X_{1\text{-}C}$, $k^Y_{1\text{-}C}$, and $k^Z_{1\text{-}C}$, respectively,
a wave vector of the second C deflecting member is $k^v_{2\text{-}C}$, and
an X component, a Y component, and a Z component of $k^v_{2\text{-}C}$ are $k^X_{2\text{-}C}$, $k^Y_{2\text{-}C}$, and $k^Z_{2\text{-}C}$, respectively.

[A05] The optical device according to [A04], in which
the first B deflecting member and the second B deflecting member each include a volume hologram diffraction grating, and satisfy $$k^X_{1\text{-}B}+k^X_{2\text{-}B}=0,$$

$$k^Y_{1\text{-}B}=k^Y_{2\text{-}B}, \text{ and}$$

$$k^Z_{1\text{-}B}=k^Z_{2\text{-}C},$$

where
a wave vector of the first B deflecting member is $k^v_{1\text{-}B}$,
an X component, a Y component, and a Z component of $k^v_{1\text{-}B}$ are $k^X_{1\text{-}B}$, $k^Y_{1\text{-}B}$, and $k^Z_{1\text{-}B}$, respectively,
a wave vector of the second B deflecting member is $k^v_{2\text{-}B}$, and
an X component, a Y component, and a Z component of $k^v_{2\text{-}B}$ are $k^X_{2\text{-}B}$, $k^Y_{2\text{-}B}$, and $k^Z_{2\text{-}B}$, respectively.

[A06] The optical device according to [A05], in which $$k^v_{1\text{-}A}+k^v_{1\text{-}B}+k^v_{1\text{-}C}=0, \text{ and}$$

$$k^v_{2\text{-}A}+k^v_{2\text{-}B}+k^v_{2\text{-}C}=0$$

are satisfied.

[A07] The optical device according to any one of [A01] to [A06], in which
the part of the light that is emitted from the image forming device and enters the first A deflecting member enters the second A deflecting member.

[A08] The optical device according to [A07], in which
the first A deflecting member and the second A deflecting member partially overlap.

[A09] The optical device according to any one of [A01] to [A08], in which
the first A deflecting member and the first B deflecting member are laminated, and
the second A deflecting member and the second B deflecting member are laminated.

[A10] The optical device according to any one of [A01] to [A09], in which
the first A deflecting member, the first B deflecting member, and the first C deflecting member each include a volume hologram diffraction grating, and satisfy $$\eta_{1\text{-}B}/\eta_{1\text{-}A}<1, \text{ and}$$

where
with respect to the light emitted from the image forming device,
an average diffraction efficiency of the first A deflecting member is $\eta_{1\text{-}A}$,
an average diffraction efficiency of the first B deflecting member is $\eta_{1\text{-}B}$, and
an average diffraction efficiency of the first C deflecting member is $\eta_{1\text{-}C}$, and
the second A deflecting member, the second B deflecting member, and the second C deflecting member each include a volume hologram diffraction grating, and satisfy $$\eta_{2\text{-}B}/\eta_{2\text{-}A}<1, \text{ and}$$

$$\eta_{2\text{-}C}/\eta_{2\text{-}A}<1$$

where
with respect to the light emitted from the image forming device,
an average diffraction efficiency of the second A deflecting member is $\eta_{2\text{-}A}$,
an average diffraction efficiency of the second B deflecting member is $\eta_{2\text{-}B}$, and an average diffraction efficiency of the second C deflecting member is $\eta_{2-C}$.

[B01]<Image Display Device>
An image display device, including:
an image forming device; and
an optical device, on which light emitted from an image forming device is incident, in which the light is guided, and from which the light is emitted, the optical device including the optical device according to any one of [A01] to [A10].

[C01]<Display Apparatus>
A display apparatus, including:
a frame to be mounted to a head of an observer; and
an image display device attached to the frame,
the image display device including
an image forming device, and
an optical device, on which light emitted from the image forming device is incident, in which the light is guided, and from which the light is emitted, the optical device including the optical device according to any one of [A01] to [A10].

REFERENCE SIGNS LIST 10 optical device
11 image display device
20 light guide plate
21 first surface of light guide plate
22 second surface of light guide plate
23 support member
31 first A deflecting member
32 first B deflecting member
33 first C deflecting member
41 second A deflecting member
42 second B deflecting member
43 second C deflecting member
50 frame
51 front portion
51' rim
51" nose pad
52 hinge
53 temple portion
54 tip cell portion
55 wiring (signal line, power line, or the like)
56 headphone portion
57 headphone portion wiring
58 control device (control circuit, control means)
60, 60A, 60B, 60C image forming device
70 housing
71 light source
72 polarizing beam splitter (PBS)
73 liquid crystal display (LCD)
74 organic EL display device
75 organic EL display device
76 convex lens
81 light source
82 collimating optical system
83 total reflection mirror
84 scanning means
85 relay optical system
90 pupil of observer

What is claimed is:

1. An optical device, on which light emitted from an image forming device is incident, in which the light is guided, and from which the light is emitted, the optical device comprising:
a light guide plate;
a first deflecting unit; and
a second deflecting unit, wherein
the first deflecting unit includes a first A deflecting member, a first B deflecting member, and a first C deflecting member,
the second deflecting unit includes a second A deflecting member, a second B deflecting member, and a second C deflecting member,
the first A deflecting member and the second A deflecting member being in a different plane than the first B deflecting member and the second B deflecting member,
part of the light emitted from the image forming device enters the first A deflecting member,
light incident on the first A deflecting member is deflected by the first A deflecting member, enters the first B deflecting member by total reflection inside of the light guide plate, is deflected by the first B deflecting member, enters the first C deflecting member by total reflection inside of the light guide plate, is deflected by the first C deflecting member, and is emitted toward a pupil of an observer,
at least a remaining part of the light emitted from the image forming device enters the second A deflecting member,
light incident on the second A deflecting member is deflected by the second A deflecting member, enters the second B deflecting member by total reflection inside of the light guide plate, is deflected by the second B deflecting member, enters the second C deflecting member by total reflection inside of the light guide plate, is deflected by the second C deflecting member, and is emitted toward the pupil of the observer, and
assuming that a direction obtained when a propagation direction of the light deflected by the first A deflecting member is orthogonally projected on the light guide plate is a first direction, and that a direction obtained when a propagation direction of the light deflected by the second A deflecting member is orthogonally projected on the light guide plate is a second direction, the first direction is opposite to the second direction.

2. The optical device according to claim 1, wherein assuming that
a point on the light guide plate, at which light emitted from the center point of an image forming region of the image forming device collides with the light guide plate, is an origin,
an axis line of the light guide plate that passes through the origin and is directed toward the first direction is an X-axis,
an axis in a thickness direction of the light guide plate that passes through the origin is a Z-axis, and
an axis that is orthogonal to the X-axis and the Z-axis is a Y-axis,
the first deflecting unit and the second deflecting unit are disposed symmetrically to a YZ plane.

3. The optical device according to claim 1, wherein the first A deflecting member and the second A deflecting member each include a volume hologram diffraction grating, and satisfy $k^X_{1-A}+k^X_{2-A}=0$, $k^Y_{1-A}=k^Y_{2-A}$, and $k^Z_{1-A}=k^Z_{2-A}$, where
a wave vector of the first A deflecting member is $k^v_{1-A}$,
an X component, a Y component, and a Z component of $k^v_{1-A}$ are $k^X_{1-A}$, $k^Y_{1-A}$, and $k^Z_{1-A}$, respectively,
a wave vector of the second A deflecting member is $k^v_{2-A}$, and
an X component, a Y component, and a Z component of $k^v_{2-A}$ are $k^X_{2-A}$, $k^Y_{2-A}$, and $k^Z_{2-A}$, respectively.

4. The optical device according to claim 3, wherein
the first C deflecting member and the second C deflecting member each include a volume hologram diffraction grating, and satisfy $$k^X_{1-C}+k^X_{2-C}=0,$$

$$k^Y_{1-C}=k^Y_{2-C}, \text{ and}$$

$$k^Z_{1-C}=k^Z_{2-C},$$

where
a wave vector of the first C deflecting member is $k^v_{1-C}$,
an X component, a Y component, and a Z component of $k^v_{1-C}$ are $k^X_{1-C}$, $k^Y_{1-C}$, and $k^Z_{1-C}$, respectively,
a wave vector of the second C deflecting member is $k^v_{2-C}$, and
an X component, a Y component, and a Z component of $k^v_{2-C}$ are $k^X_{2-C}$, $k^Y_{2-C}$, and $k^Z_{2-C}$, respectively.

5. The optical device according to claim 4, wherein
the first B deflecting member and the second B deflecting member each include a volume hologram diffraction grating, and satisfy $$k^X_{1-B}+k^X_{2-B}=0,$$

$$k^Y_{1-B}=k^Y_{2-B}, \text{ and}$$

$$k^Z_{1-B}=k^Z_{2-C},$$

where
a wave vector of the first B deflecting member is $k^v_{1-B}$,
an X component, a Y component, and a Z component of $k^v_{1-B}$ are $k^X_{1-B}$, $k^Y_{1-B}$, and $k^Z_{1-B}$, respectively,
a wave vector of the second B deflecting member is $k^v_{2-B}$, and
an X component, a Y component, and a Z component of $k^v_{2-B}$ are $k^X_{2-B}$, $k^Y_{2-B}$, and $k^Z_{2-B}$, respectively.

6. The optical device according to claim 5, wherein $$k^v_{1-A}+k^v_{1-B}+k^v_{1-C}=0, \text{ and}$$

$$k^v_{2-A}+k^v_{2-B}+k^v_{2-C}=0$$

are satisfied.

7. The optical device according to claim 1, wherein
the part of the light that is emitted from the image forming device and enters the first A deflecting member enters the second A deflecting member.

8. The optical device according to claim 7, wherein
the first A deflecting member and the second A deflecting member partially overlap.

9. The optical device according to claim 1, wherein
the first A deflecting member and the first B deflecting member are laminated, and
the second A deflecting member and the second B deflecting member are laminated.

10. The optical device according to claim 1, wherein
the first A deflecting member, the first B deflecting member, and the first C deflecting member each include a volume hologram diffraction grating, and satisfy $$\eta_{1-B}/\eta_{1-A}<1, \text{ and}$$

$$\eta_{1-C}/\eta_{1-A}<1$$

where
with respect to the light emitted from the image forming device,
an average diffraction efficiency of the first A deflecting member is $\eta_{1-A}$,
an average diffraction efficiency of the first B deflecting member is $\eta_{1-B}$, and
an average diffraction efficiency of the first C deflecting member is $\eta_{1-C}$, and
the second A deflecting member, the second B deflecting member, and the second C deflecting member each include a volume hologram diffraction grating, and satisfy $$\eta_{2-B}/\eta_{2-A}<1, \text{ and}$$

$$\eta_{2-C}/\eta_{2-A}<1$$

where
with respect to the light emitted from the image forming device,
an average diffraction efficiency of the second A deflecting member is $\eta_{1-A}$,
an average diffraction efficiency of the second B deflecting member is $\eta_{1-B}$, and
an average diffraction efficiency of the second C deflecting member is $\eta_{2-C}$.

11. An image display device, comprising:
an image forming device; and
an optical device, on which light emitted from the image forming device is incident, in which the light is guided, and from which the light is emitted, the optical device including
a light guide plate,
a first deflecting unit, and
a second deflecting unit, wherein
the first deflecting unit includes a first A deflecting member, a first B deflecting member, and a first C deflecting member,
the second deflecting unit includes a second A deflecting member, a second B deflecting member, and a second C deflecting member,
the first A deflecting member and the second A deflecting member being in a different plane than the first B deflecting member and the second B deflecting member,
part of the light emitted from the image forming device enters the first A deflecting member,
light incident on the first A deflecting member is deflected by the first A deflecting member, enters the first B deflecting member by total reflection inside of the light guide plate, is deflected by the first B deflecting member, enters the first C deflecting member by total reflection inside of the light guide plate, is deflected by the first C deflecting member, and is emitted toward a pupil of an observer,
at least a remaining part of the light emitted from the image forming device enters the second A deflecting member,
light incident on the second A deflecting member is deflected by the second A deflecting member, enters the second B deflecting member by total reflection inside of the light guide plate, is deflected by the second B deflecting member, enters the second C deflecting member by total reflection inside of the light guide plate, is deflected by the second C deflecting member, and is emitted toward the pupil of the observer, and assuming that a direction obtained when a propagation direction of the light deflected by the first A deflecting member is orthogonally projected on the light guide plate is a first direction, and that a direction obtained when a propagation direction of the light deflected by the second A deflecting member is orthogonally projected on the light guide plate is a second direction, the first direction is opposite to the second direction.

12. The image display device according to claim 11, wherein
assuming that
a point on the light guide plate, at which light emitted from the center point of an image forming region of the image forming device collides with the light guide plate, is an origin,
an axis line of the light guide plate that passes through the origin and is directed toward the first direction is an X-axis,
an axis in a thickness direction of the light guide plate that passes through the origin is a Z-axis, and
an axis that is orthogonal to the X-axis and the Z-axis is a Y-axis,
the first deflecting unit and the second deflecting unit are disposed symmetrically to a YZ plane.

13. The image display device according to claim 11, wherein
the part of the light that is emitted from the image forming device and enters the first A deflecting member enters the second A deflecting member.

14. The image display device according to claim 13, wherein
the first A deflecting member and the second A deflecting member partially overlap.

15. The image display device according to claim 11, wherein
the first A deflecting member and the first B deflecting member are laminated, and
the second A deflecting member and the second B deflecting member are laminated.

16. A display apparatus, comprising:
a frame to be mounted to a head of an observer; and
an image display device attached to the frame,
the image display device including
an image forming device, and
an optical device, on which light emitted from the image forming device is incident, in which the light is guided, and from which the light is emitted, the optical device including
a light guide plate,
a first deflecting unit, and
a second deflecting unit, wherein
the first deflecting unit includes a first A deflecting member, a first B deflecting member, and a first C deflecting member,
the second deflecting unit includes a second A deflecting member, a second B deflecting member, and a second C deflecting member,
the first A deflecting member and the second A deflecting member being in a different plane than the first B deflecting member and the second B deflecting member,
part of the light emitted from the image forming device enters the first A deflecting member,
light incident on the first A deflecting member is deflected by the first A deflecting member, enters the first B deflecting member by total reflection inside of the light guide plate, is deflected by the first B deflecting member, enters the first C deflecting member by total reflection inside of the light guide plate, is deflected by the first C deflecting member, and is emitted toward a pupil of an observer,
at least a remaining part of the light emitted from the image forming device enters the second A deflecting member,
light incident on the second A deflecting member is deflected by the second A deflecting member, enters the second B deflecting member by total reflection inside of the light guide plate, is deflected by the second B deflecting member, enters the second C deflecting member by total reflection inside of the light guide plate, is deflected by the second C deflecting member, and is emitted toward the pupil of the observer, and
assuming that a direction obtained when a propagation direction of the light deflected by the first A deflecting member is orthogonally projected on the light guide plate is a first direction, and that a direction obtained when a propagation direction of the light deflected by the second A deflecting member is orthogonally projected on the light guide plate is a second direction, the first direction is opposite to the second direction.

17. The display apparatus according to claim 16, wherein
assuming that
a point on the light guide plate, at which light emitted from the center point of an image forming region of the image forming device collides with the light guide plate, is an origin,
an axis line of the light guide plate that passes through the origin and is directed toward the first direction is an X-axis,
an axis in a thickness direction of the light guide plate that passes through the origin is a Z-axis, and
an axis that is orthogonal to the X-axis and the Z-axis is a Y-axis,
the first deflecting unit and the second deflecting unit are disposed symmetrically to a YZ plane.

18. The display apparatus according to claim 16, wherein
the part of the light that is emitted from the image forming device and enters the first A deflecting member enters the second A deflecting member.

19. The display apparatus according to claim 18, wherein
the first A deflecting member and the second A deflecting member partially overlap.

20. The display apparatus according to claim 16, wherein
the first A deflecting member and the first B deflecting member are laminated, and
the second A deflecting member and the second B deflecting member are laminated.

* * * * *